United States Patent
Jasmin et al.

(10) Patent No.: US 11,949,373 B1
(45) Date of Patent: Apr. 2, 2024

(54) WIRE MANAGEMENT CLIPS AND SYSTEMS FOR SOLAR PANELS AND SOLAR PANEL RACKING SYSTEMS

(71) Applicant: Sunmodo Corporation, Vancouver, WA (US)

(72) Inventors: Roland Jasmin, Portland, OR (US); Steve Mumma, Oregon City, OR (US); Jon M. Orrell, Oregon City, OR (US)

(73) Assignee: Sunmodo Corporation, Vancouver, WA (US)

(*) Notice: Subject to any disclaimer, the term of this patent is extended or adjusted under 35 U.S.C. 154(b) by 0 days.

(21) Appl. No.: 18/058,729

(22) Filed: Nov. 23, 2022

(51) Int. Cl.
- *H02S 40/30* (2014.01)
- *H02S 30/10* (2014.01)
- *H02S 20/10* (2014.01)
- *H02S 20/23* (2014.01)

(52) U.S. Cl.
CPC .............. *H02S 40/30* (2014.12); *H02S 30/10* (2014.12); *H02S 20/10* (2014.12); *H02S 20/23* (2014.12)

(58) Field of Classification Search
None
See application file for complete search history.

(56) References Cited

U.S. PATENT DOCUMENTS

| | | |
|---|---|---|
| 2,278,691 A | 4/1942 | Cotter |
| 4,688,961 A | 8/1987 | Shioda |
| D295,723 S | 5/1988 | Shioda |
| D295,724 S | 5/1988 | Shioda |
| D295,725 S | 5/1988 | Shioda |
| D296,074 S | 6/1988 | Seyfarth |
| D375,890 S | 11/1996 | Takai |
| D376,309 S | 12/1996 | Takai |
| D521,366 S | 5/2006 | Polak et al. |
| D597,403 S | 8/2009 | Ho et al. |
| 8,935,893 B2 | 1/2015 | Liu |
| 10,253,905 B2 | 4/2019 | Martin |
| D853,336 S | 7/2019 | Barram |
| 10,945,803 B2 | 3/2021 | Recanati et al. |
| D942,251 S | 2/2022 | Laaksonen et al. |

(Continued)

FOREIGN PATENT DOCUMENTS

| | | |
|---|---|---|
| CN | 104235511 A | 12/2014 |
| CN | 105743030 A | 7/2016 |

(Continued)

OTHER PUBLICATIONS

Solar's Fastest Attachment Nanomount, Feb. 2020, Sunmodo Corporation, Vancouver, Washington.

(Continued)

*Primary Examiner* — Steven M Marsh
(74) *Attorney, Agent, or Firm* — Stone Creek Services LLC; Alan M Flum

(57) ABSTRACT

Disclosed are systems and devices for managing wires and cables associated with residential, commercial, industrial, and utility-scale solar panel installations. The system can include wire management clips. Some of the wire management clips described can attach to the sides and tops of rails that are used to mount solar panels. Others can attach to the return flange (i.e., inner lip) of a solar panel frame. The wire management clips that mount to the return flange can be used in both rail and rail-less solar panel assemblies.

25 Claims, 22 Drawing Sheets

(56) References Cited

U.S. PATENT DOCUMENTS

| | | |
|---|---|---|
| 11,236,858 B1 * | 2/2022 | Rigby .................... H02G 3/263 |
| 11,296,648 B1 | 4/2022 | Jasmin et al. |
| 2006/0008235 A1 * | 1/2006 | Krampotich ............ H02G 3/32 |
| | | 385/136 |
| 2006/0151674 A1 | 7/2006 | Hancock |
| 2009/0293233 A1 | 9/2009 | Garrison et al. |
| 2009/0223041 A1 | 12/2009 | Ho et al. |
| 2012/0192925 A1 | 8/2012 | Grushkowitz et al. |
| 2013/0075152 A1 | 3/2013 | Mazzone |
| 2014/0061396 A1 | 3/2014 | Magno, Jr. et al. |
| 2014/0326838 A1 | 11/2014 | West et al. |
| 2017/0346439 A1 | 11/2017 | Pereira et al. |
| 2018/0019703 A1 | 1/2018 | Almy et al. |
| 2020/0343855 A1 | 10/2020 | Baird |
| 2020/0366076 A1 | 11/2020 | Naugler et al. |
| 2020/0366238 A1 | 11/2020 | Schimpf |
| 2021/0247002 A1 * | 8/2021 | Dallmann ................ H02G 3/32 |
| 2021/0324972 A1 * | 10/2021 | Arnold .................... F16L 3/243 |
| 2022/0359102 A1 * | 11/2022 | Michael ............... H01B 7/0045 |

FOREIGN PATENT DOCUMENTS

| | | | |
|---|---|---|---|
| CN | 208479572 U | 2/2019 | |
| CN | 111089199 A | 5/2020 | |
| FR | 2350717 A1 | 12/1977 | |
| GB | 2395226 A | 5/2004 | |
| GB | 2436641 A | 4/2006 | |
| JP | 2007273723 A | 10/2007 | |
| WO | WO-2022235675 A1 * | 11/2022 | ........... H01B 7/0045 |
| WO | WO-2022235679 A1 * | 11/2022 | ............ F16L 3/1033 |

OTHER PUBLICATIONS

SMR Cut Sheet, D1022-V001, Sep. 2020, Sunmodo Corporation, Vancouver, Washington.

* cited by examiner

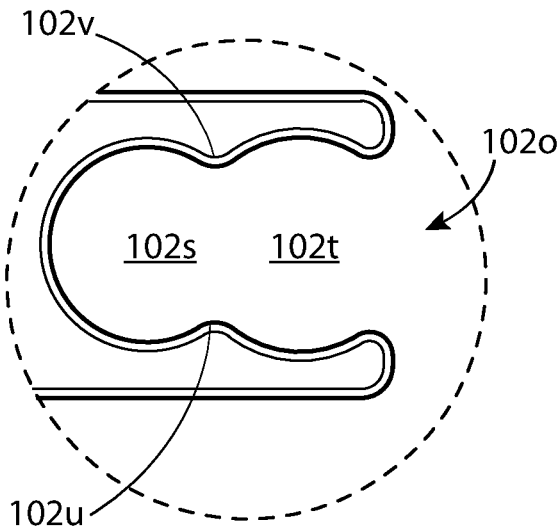
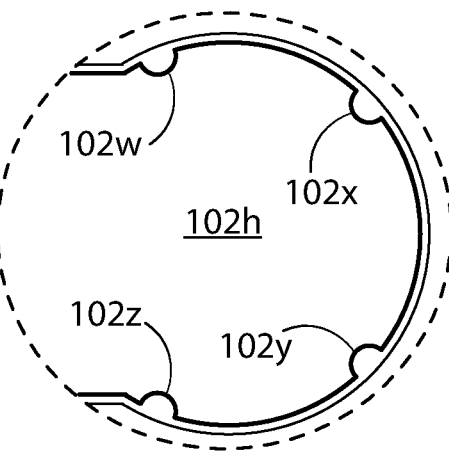
FIG. 5  FIG. 6
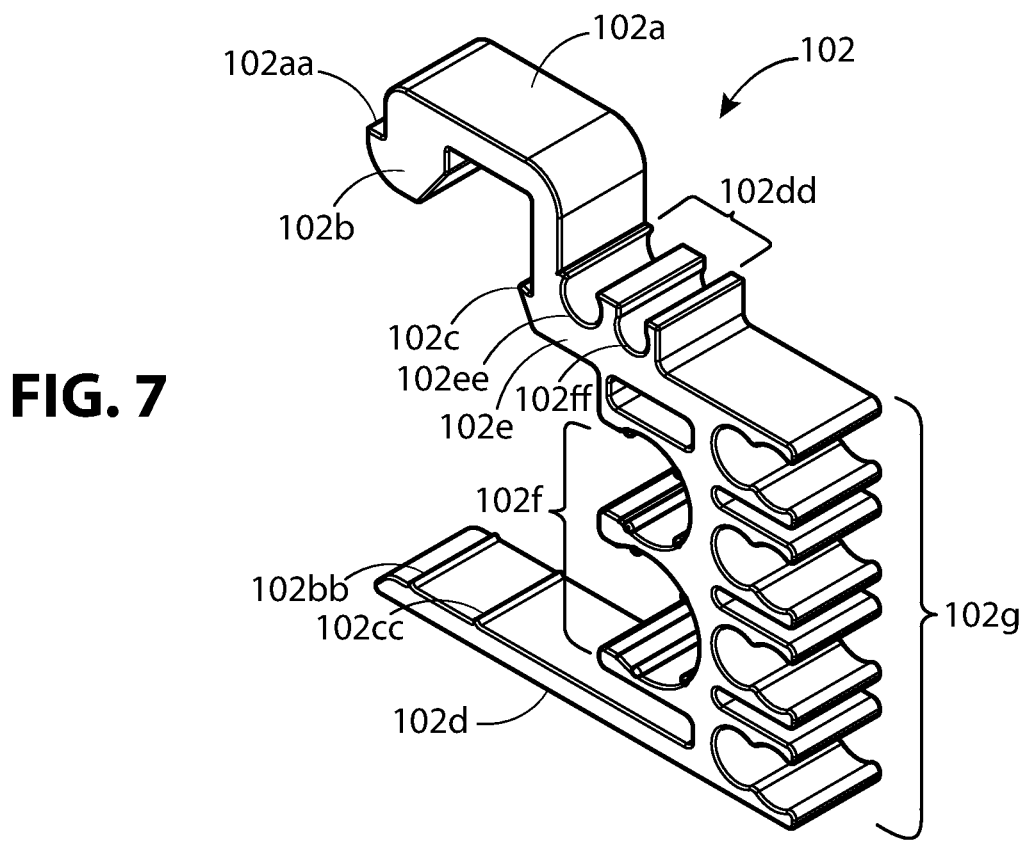
FIG. 7

WIRE MANAGEMENT CLIPS AND SYSTEMS FOR SOLAR PANELS AND SOLAR PANEL RACKING SYSTEMS

FIELD OF INVENTION

This disclosure relates to wire management clips and wire management systems for solar panel assemblies and solar panel racking systems. These solar panel assemblies and racking systems are typically attached to building structures, such as roofs, or attached to ground-mount structures.

BACKGROUND

Solar photovoltaic panels, or simply "solar panels" for the purposes of this disclosure, are installed on various types of residential and commercial roofs. These roofs can be found on building roof tops or can be found on shade structures such as awnings and carports. Solar panels can also be used in ground-mounted installations where they are typically mounted to frame structures that are secured to the ground.

Residential and commercial solar panel assemblies can have complex cabling and wiring requirements. For example, a 20-kW residential array using 480 W solar panels would require forty-two solar panels. A 1000 kW (1 MW) commercial system using 480 W solar panels would require over 2000 solar panels. Each panel has its own pair of wires. Solar panel assemblies can be wired in series (i.e., the wires chained together one after another), parallel (each tying into a common pair of conductors or thicker trunk lines), or a combination of series and parallel, to one or more central inverters. An inventor converts the direct current (DC) from the solar panel to alternating current (AC). Alternatively, each solar panel can have its own microinverter. The resulting AC signals produced by the output of the microinverters are phase synchronized (i.e., the peaks and valleys of the AC signals are aligned) and tied together, which simplifies wiring.

Regardless of the wiring scheme, local, regional, and national regulatory requirements typically require that the wires be managed. For example, current carrying conductors typically need to be held away from the ground or roof top. Because of this, various wire management systems have been developed for solar panel installations. Some of these wire management systems use cable ties, while others use mounting clips, wire trays, or wire troughs.

SUMMARY

The inventor set out to create a wire management system that could organize cables and wiring for a wide range of solar panel assemblies including residential systems that typically have under fifty solar panels, to commercial and utility-scale systems with thousands of solar panels. The inventor developed wire management clips that can be used in wire management systems for residential, commercial, and utility-scale installations. The wire management clip can handle a variety of cables from smaller grounding wires to large trunk lines and wire loops. They can organize these cables and wires for easy servicing and also to meet regulatory requirements. The inventor envisions that these wire management clips, and their resulting wire management systems, could be used in building structures, such as roof tops, carports, or shade structures, as well as ground-mount structures.

The wire management systems described in this disclosure includes one or more wire management clips. These wire management clips can include a clamp portion that is attachable to a solar panel assembly. The wire management clip can also include two or more plurality of wire channels, where each of the plurality of wire channels is oriented in different directions and can optionally be co-planar. Each plurality of wire channels can have wire channels of a different size from the other plurality of wire channels. This can allow the installer to organize the wires by wire type for ease of installation and servicing. For example, one plurality of wire channels could carry trunk lines, another plurality of wire channels could carry panel cables, and a third plurality of wire channels could carry ground wires. Each plurality of wire channels can have wire channels that are spaced apart a pre-determined distance. For example, they can be spaced apart by wire channel walls.

One or more of the plurality of wire channels could include two or more stacked wire channels spaced apart from each other. Wire apertures within the stacked wire channels can be separated by a plurality of detents. A stacked wire channel refers to a wire channel structure that includes two or more wire channels that are spaced apart by a physical separator and stacked serially away from each other with respect to a common opening. Please refer to the Definitions section of the Detailed Description for a formal definition.

The wire management clip includes one or more latches. These latches can extend from a pair of hinge arms that fold or hinge by living hinges. Each hinge arm could be used to cover a plurality of wire channels. In addition, when latched, the hinge arms could form an additional wire cavity outside the one or more plurality of wire channels in order to gather and organize additional wires or wire loops.

Alternatively, one latch could extend from a structure surrounding a wire cavity and the other from a hinge arm with a living hinge. The hinge could alternatively be a conventional hinge. This can allow, for example a downward facing plurality of wire channels to be covered when the hinge arm is latched, and provide an additional wire cavity to gather and organize additional wires or wire loops. The upward facing wire channel could remain uncovered and the wire held in place by spring tension.

Solar panel assemblies can include rails and typically include solar panels with return flanges. The figures and Detailed Description accompanying the figures, discusses an example of a wire management clip that attaches to a rail and discusses several examples of wire management clips that attach to the return flange of the solar panel frame. A return flange is the lower lip portion of a solar panel frame that projects inward underneath the solar panel. The term, return flange is defined formally in the Definitions section of the Detailed Description.

As an example, a wire management clip that is securable to a rail can include an upper arm, a lower arm, and a plurality of wire channels positioned between the upper arm and the lower arm. The rail can include a detent in the rail side, and a slot extending lengthwise along the rail top. The wire management clip can also include a clamp portion. The clamp portion can include a pivoting hook and a detenting hook extending from the upper arm. A plurality of wire channels can be positioned between the upper arm and the lower arm, with some or all of the wire channels within the plurality of wire channels spaced apart a pre-determined distance. The wire management clip is secured to the rail by the pivoting hook engaging the rail slot, the detenting hook engaging the detent, and the lower arm engaging the rail bottom.

The detenting hook and pivoting hook can be structured and arranged so that when secured to the rail, the wire management clip resists downward rotational movement but allows for removal from the rail by upward rotational movement. In addition, the detenting hook, the pivoting hook, and the lower arm can be structured and arranged to prevent direct upward movement of the wire management clip when attached to the rail. These allows for easy removal for servicing, but prevents removal of the wire management clip due to wind forces and environmental conditions.

The plurality of wire channels could be two or more different plurality of wire channels each facing a different direction. For example, a first plurality of wire channels could be positioned 180 degrees in opposition to a second plurality of wire channels. The first plurality of wire channels and the second plurality of wire channels can be co-planar so all the wires and cables run in the same direction. Wire channels within the first plurality of wire channels could be sized differently than wire channels of the second plurality of wire channels to allow the installer to organize wires of different sizes separately.

Wire management clips that attach to the return flange of a solar panel frame can include a wire clip body and a spring clip that is secured to the wire clip body. The spring clip can be embedded into the wire clip body or can be formed as part of the wire clip body. The spring clip could be metallic, such as spring steel, and embedded in a non-metallic wire clip body, such as plastic. Alternatively, the spring clip and wire clip body could both be made of metal and extruded together. The spring clip could be made of plastic with enough tensile and holding strength to secure the spring clip to the return flange under normal operation. The spring clip can be sized and shaped to secure the wire management clip to the return flange. The wire clip body could include one plurality of wire channels with one or more wire channels of one size and facing a particular direction, and a second plurality of wire channels with wire channels of a different size and facing a different direction. One or more of the plurality of wire channels could be covered by either an upper arm or a lower arm made movable by a living hinge or by a conventional hinge. As previously discussed, the various plurality of wire channels could be co-planar to orient the wires and cables in the same direction.

These examples are representative and are not meant to limit the inventive concept to the examples given. This summary is not exhaustive. Additional features and advantages will be apparent from the Detailed Description, drawings, and claims.

BRIEF DESCRIPTION OF DRAWINGS

FIG. 5 illustrates a portion of FIG. 4 enlarged to show the details of one of the stacked wire channels.

FIG. 6 illustrates a portion of FIG. 4 enlarged to show details on one of the wire channels.

FIG. 7 illustrates, in front and top isometric view, the wire management clip of FIG. 2.

DETAILED DESCRIPTION

When describing the figures, the terms "top," "bottom," "front," "side," "left," and "right" are relative terms. Specific dimensions are intended to help the reader understand the scale of the disclosed material. Dimensions given are typical and the claims are not limited to the recited dimensions. Ordinals such as "first," "second," or "third," are used in this Detailed Description and in the claims to differentiate between similarly-named parts and do not imply a particular order, preference, or importance. "Optional" or "optionally" is used throughout this disclosure to describe features or structures that are optional. Not using the word "optional" or "optionally" to describe a feature or structure does not imply that the feature or structure is not optional. Finally, the word "or" is used in the ordinary sense to mean an "inclusive or," unless preceded by a qualifier, such as the word "either," that signals an "exclusive or."

The Detailed Description is organized in the following sections: Definitions, System Overview, General Principles, Examples, and Conclusion.

Definitions

Return Flange: As defined in this disclosure, a return flange is the lower lip portion of a solar panel frame that projects inward underneath the solar panel.

Stacked Wire Channel: As defined in this disclosure, a stacked wire channel includes two or more wire channels that are spaced apart by a physical separator and stacked serially away from each other with respect to a common opening.

Rail Face: As defined in this disclosure, a rail face refers to a rail top, a first rail side, a second rail side, or a rail bottom. A rail described as having rail faces, one or more rail faces, two or more rail faces, or three or more rail faces, may include all of the rail faces named above or a subset of these four rail faces. For example, a rail with two or more faces may include a first rail side, a second rail side, and a rail bottom, but not have a rail top (i.e., the rail is open on the top).

System Overview

The inventor developed a wire management system that can organize wires within a solar panel assembly that is suitable for residential, commercial, industrial, and utility-scale environments. The wire management system can, for example, organize wires originating from the solar panels, inverters, microinverters, system trunk lines, as well as ground (earth) wires.

Figure 1:
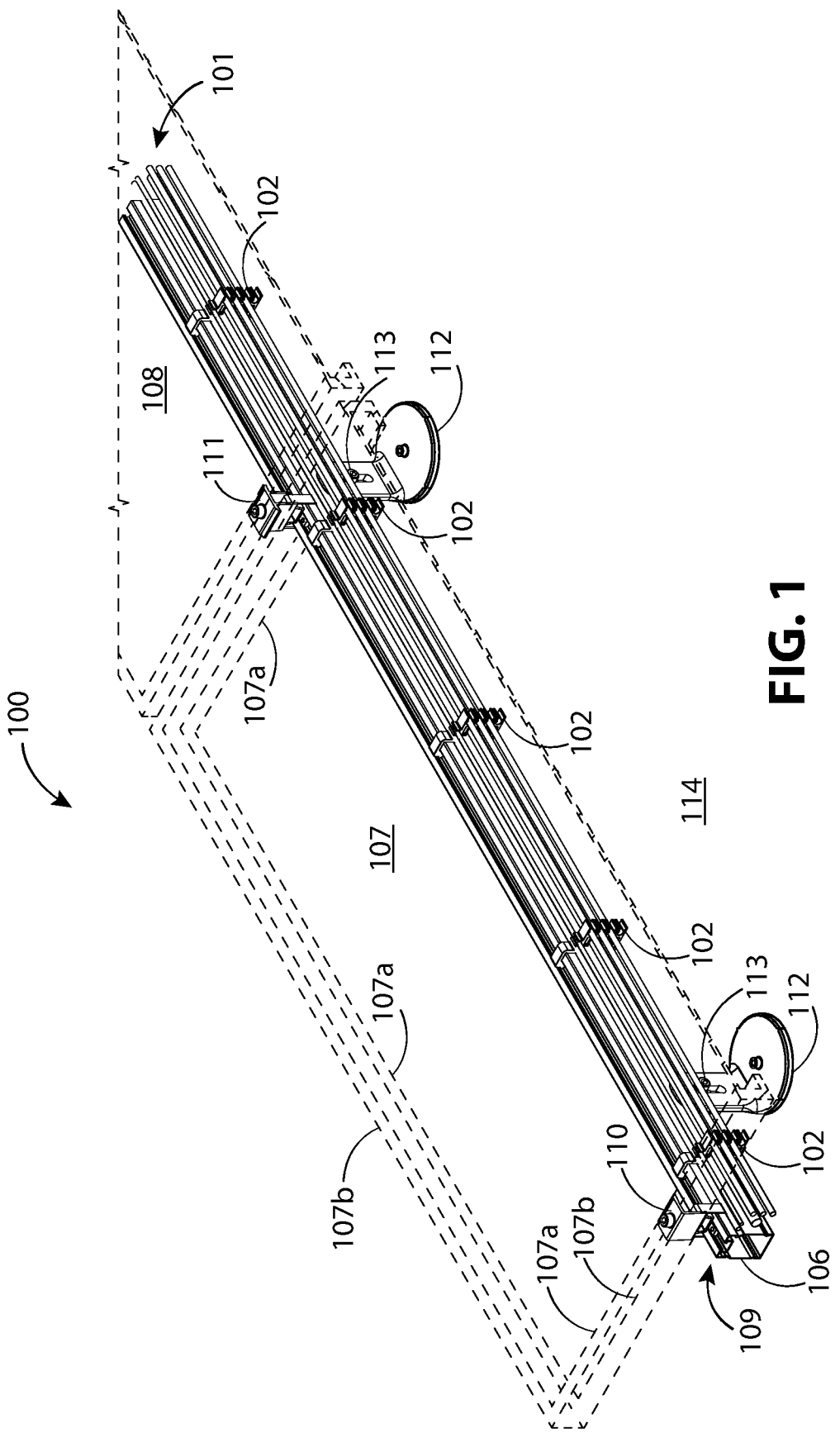
FIG. 1 illustrates, in front and top isometric view, a rearward portion of a solar panel assembly cutaway to show a wire management system secured to rails, for clarity, the solar panel is outlined with dashed lines.

FIG. 1 illustrates a solar panel assembly 100 with a wire management system 101 of this disclosure. The wire management system 101 is illustrated using a number of instances of a wire management clip 102. Wire management clip 102 is illustrated in FIGS. 2-4, and 7.

The solar panel assembly 100 is illustrated with a solar panel racking system 109. Solar panel racking system 109 is illustrated with rail 106, solar panel end clamp 110, solar panel mid clamp 111, and the L-foot 112. The L-foot 112 is secured to the rail 106 by an L-foot adapter, which is hidden from view. The rail 106 snaps into or rotates into the L-foot adapter and the L-foot adapter is secured to the L-foot 112 by a fastener, for example a threaded fastener 113. The solar panel end clamp 110 and solar panel mid clamp 111 are known as over-the-panel clamps because they exert pressure on the top of the solar panel frame 107b to clamp the solar panel 107 to the rail 106. The solar panel assembly 100 would typically be installed on a roof, for example roof 114.

The solar panel assembly 100 is simplified for illustration. It illustrates the rearward portions of two solar panels, solar panel 107 and solar panel 108, with the front of the panels cutaway to show wire management system 101 and the solar panel racking system 109. The solar panels are shown in dashed lines and illustrated as if they were transparent in order to clearly illustrate the solar panel racking system 109 and the wire management system 101. The frontward portion of solar panel 107 and solar panel 108 would contain a similar rail, over-the-panel clamps, and wire management system. The wire management system in the frontward portion of the solar panels would typically face inward toward the rail 106 to route the wires between the rails.

While the solar panel assembly 100 is simplified for illustration as discussed above and shows two solar panels. A typical solar panel assembly generally includes more solar panels and the wire management clip utilizing principles described in this disclosure can be used in residential, commercial, or utility-scale systems. As an example, a 11 kW residential array using 375 W solar panels could require an array size of thirty solar panels. A 750 kW commercial system using 375 W panels could include as many as 2000 solar panels, and wire management clips using principles described in this disclosure could be used in both of these systems.

The solar panel assembly 100 is not limited to roof mount systems. Wire management clips using the principles described in this disclosure could be applied to roofs on building structures that include residential, commercial, and industrial environments. The wire management clips can also be applied to ground-mount structures. For example, ground-mount structures in residential properties or ground-mount structures in commercial, industrial, or utility scale environments. While the solar panel assembly 100 illustrates the use of a rail-based system, wire management clip 103 of FIGS. 8-13, wire management clip 104 of FIGS. 14-20, and wire management clip 105 of FIGS. 21-26 could be used in either rail-based or rail-less solar panel mounting systems and could be used in FIG. 1 in place of or in addition to wire management clip 102.

In addition, while the solar panel assembly 100 of FIG. 1 illustrates over-the-panel clamps, i.e., solar panel end clamp 110 and solar panel mid clamp 111, the wire management clips of this disclosure can be used with solar panel systems utilizing under-the-panel clamps. In other words, the wire management clips are independent of the type of panel clamp used.

General Principles

Figure 2:
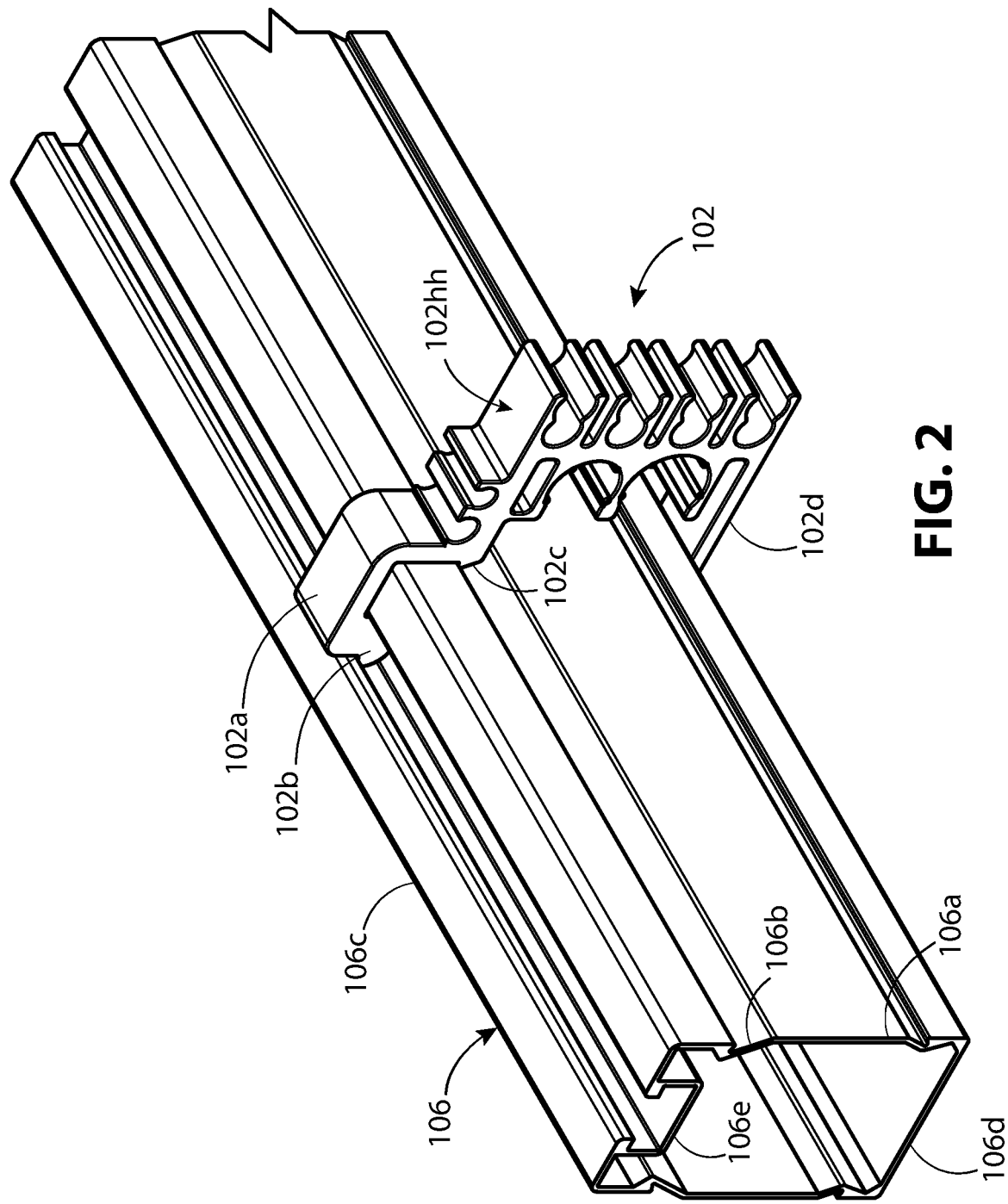
FIG. 2 illustrates, in front and top isometric view, a portion of the rail and a wire management clip of FIG. 1.
Figure 3:
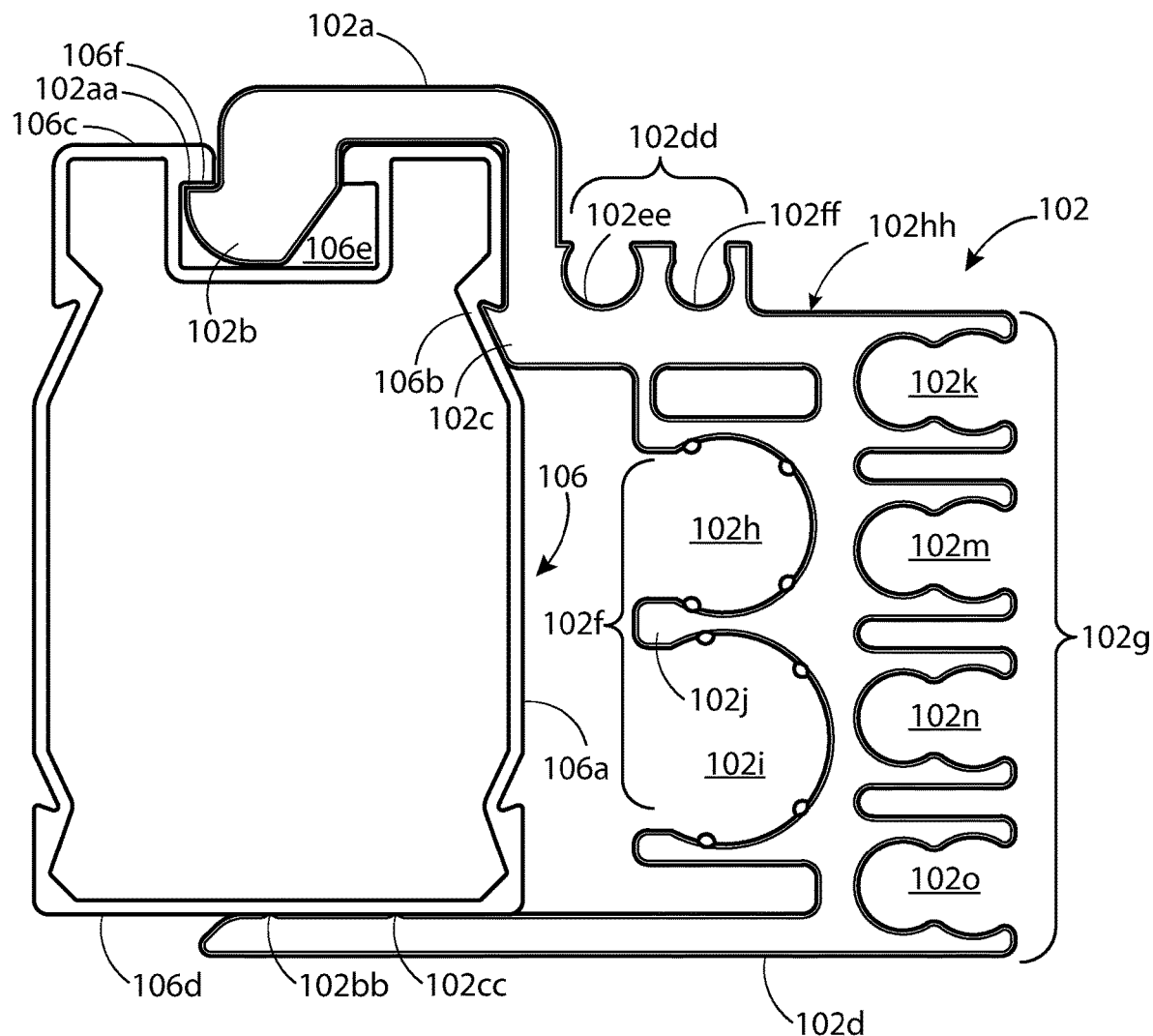
FIG. 3 illustrates, in side view, the rail and wire management clip of FIG. 2.
Figure 4:
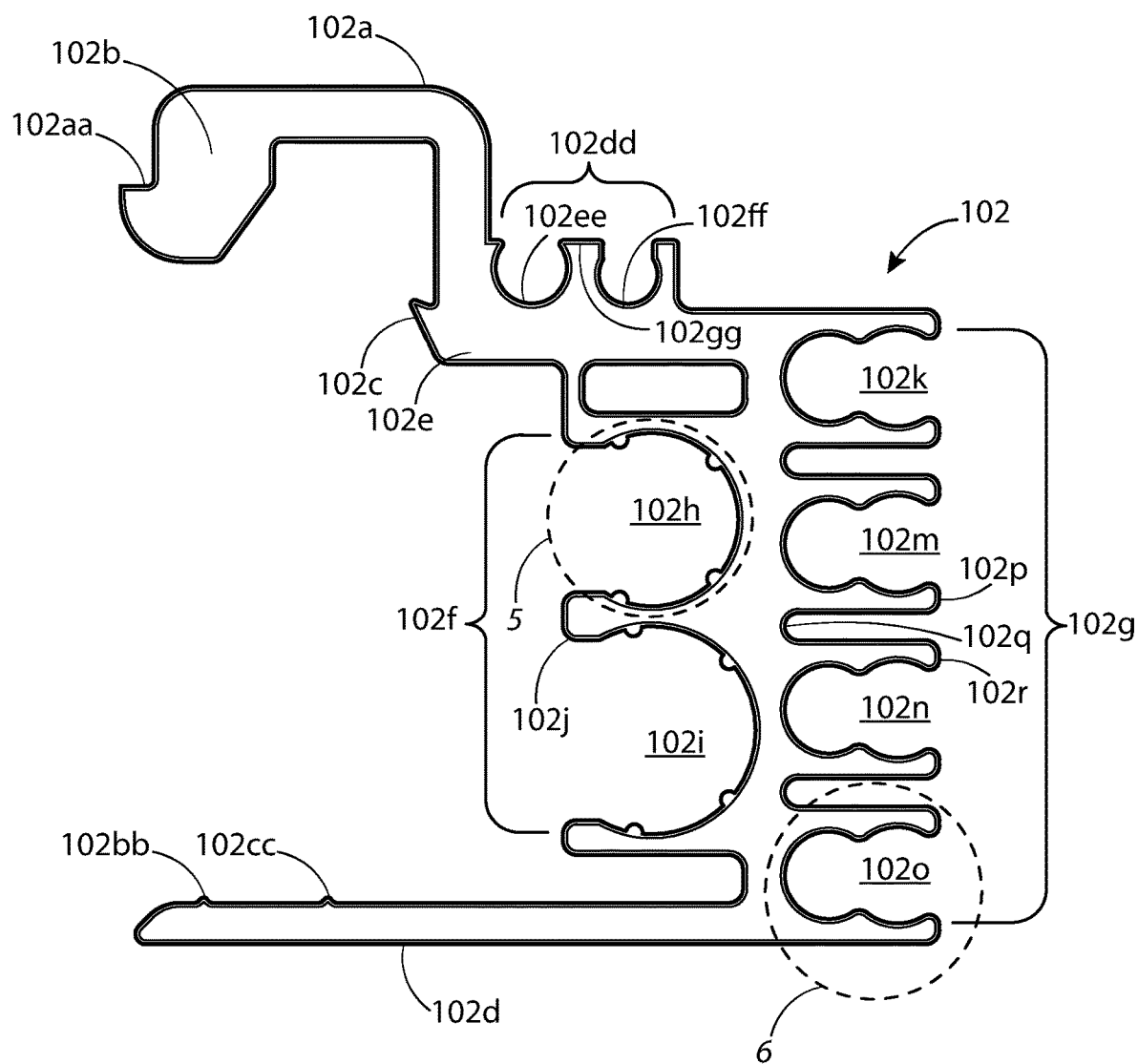
FIG. 4 illustrates, in side view, the wire management clip of FIG. 2.
Figure 8:
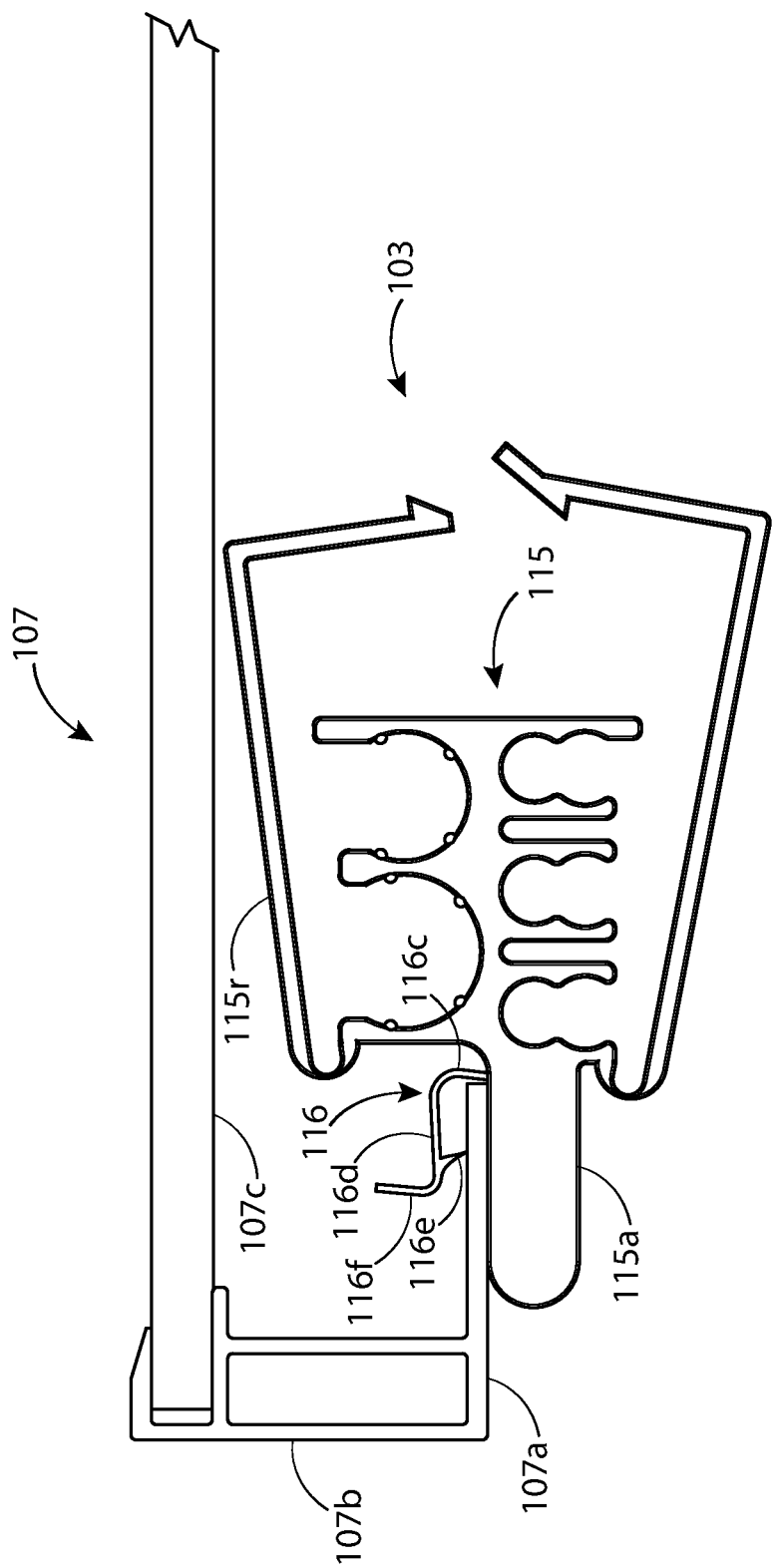
FIG. 8 illustrates, in side view, a first example of a wire management clip mounted to the return flange of a solar panel, with the solar panel cutaway to show the wire management clip.
Figure 13:
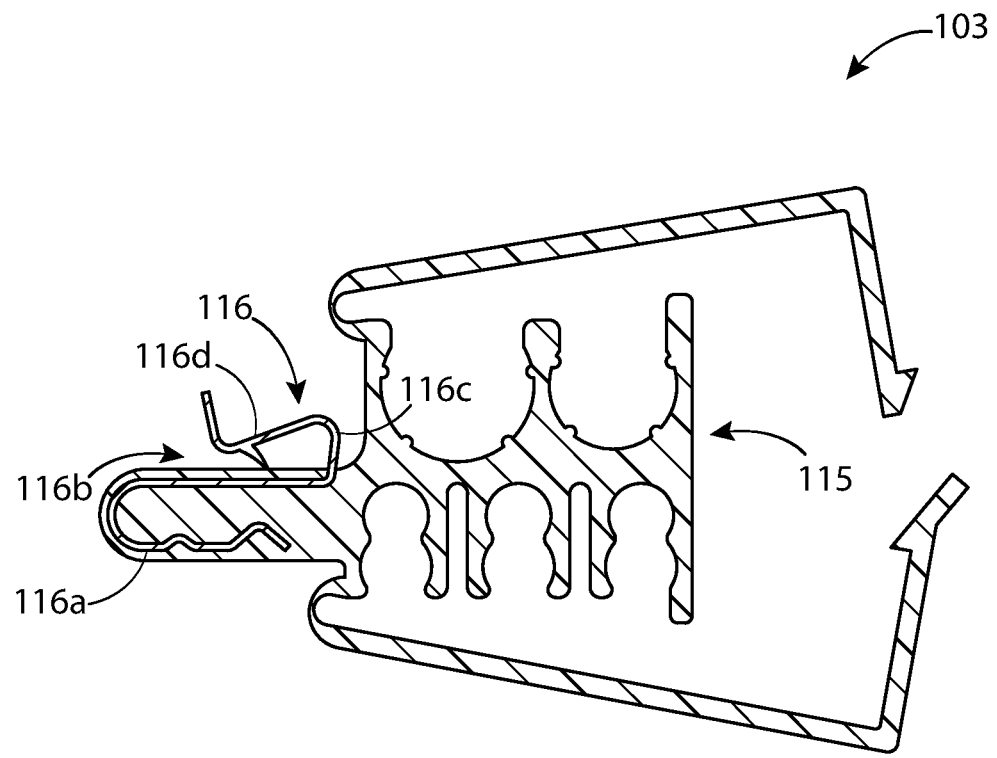
FIG. 13 illustrates, a section view of the wire management clip taken along section lines 13-13 in FIG. 12.
Figure 14:
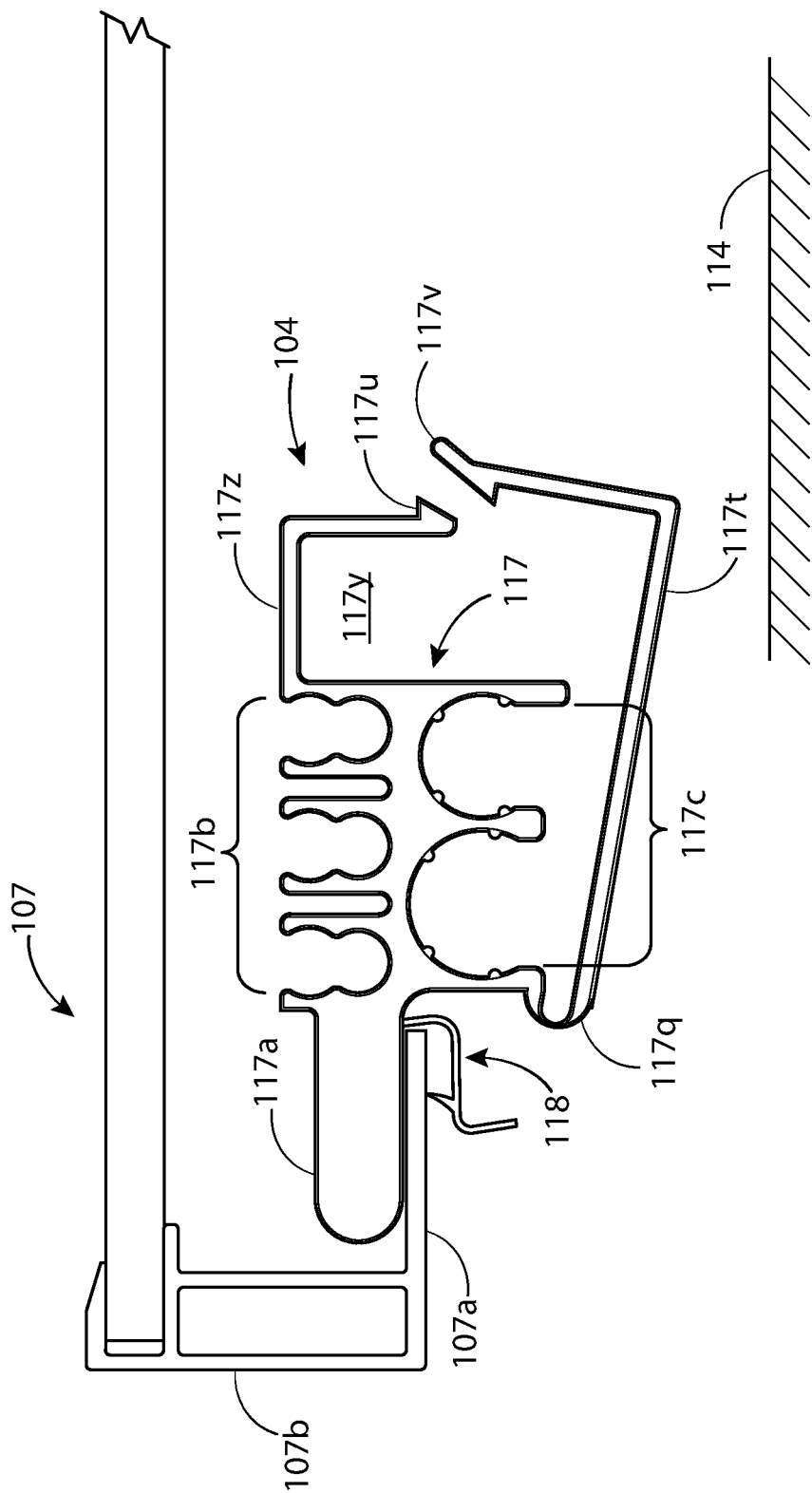
FIG. 14 illustrates, in side view, a second example of a wire management clip mounted to the return flange of a solar panel, with the solar panel cutaway to show the wire management clip.
Figure 15:
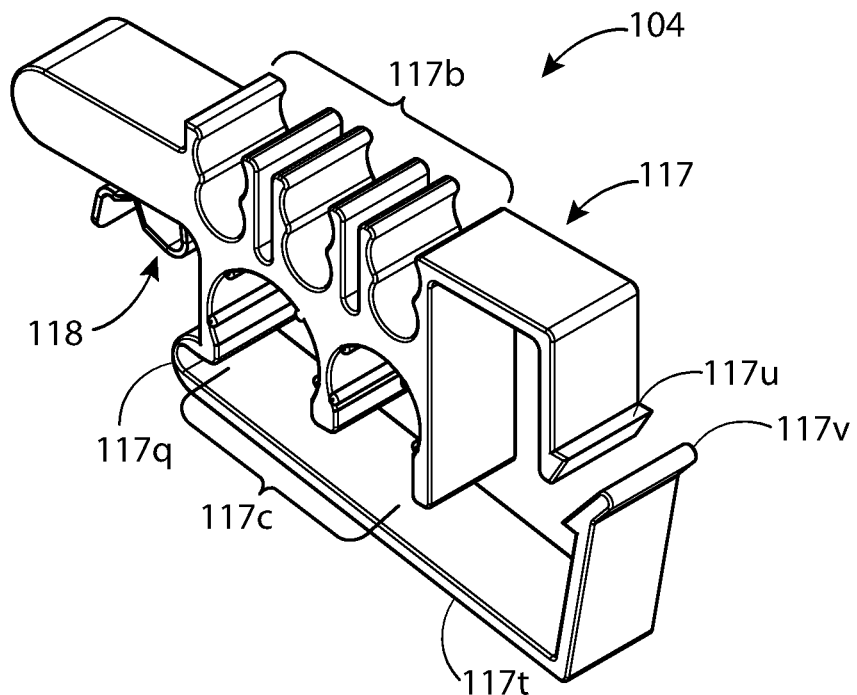
FIG. 15 illustrates, in top and front isometric view, the wire management clip of FIG. 14.
Figure 16:
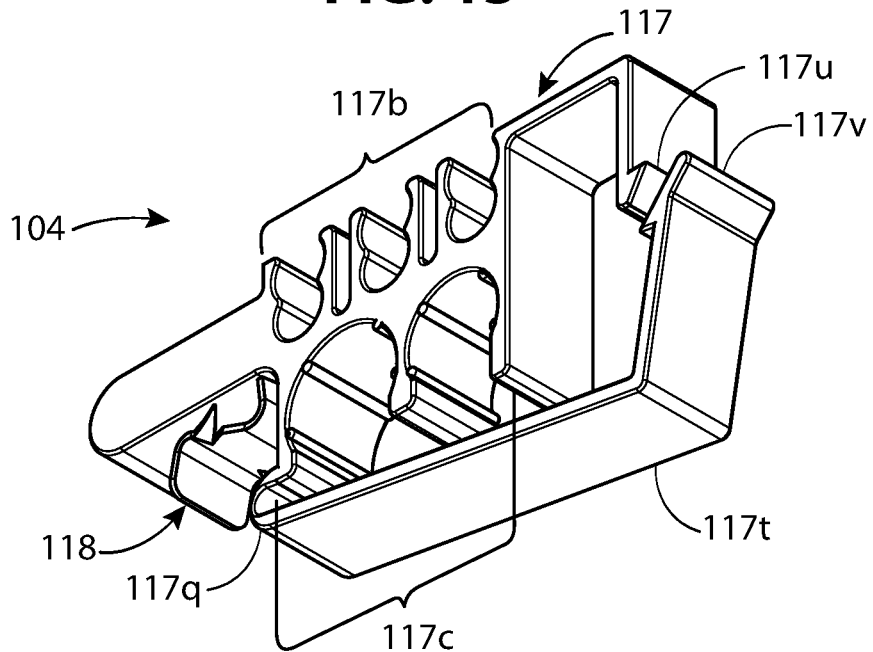
FIG. 16 illustrates, in bottom and front isometric view, the wire management clip of FIG. 14
Figure 20:
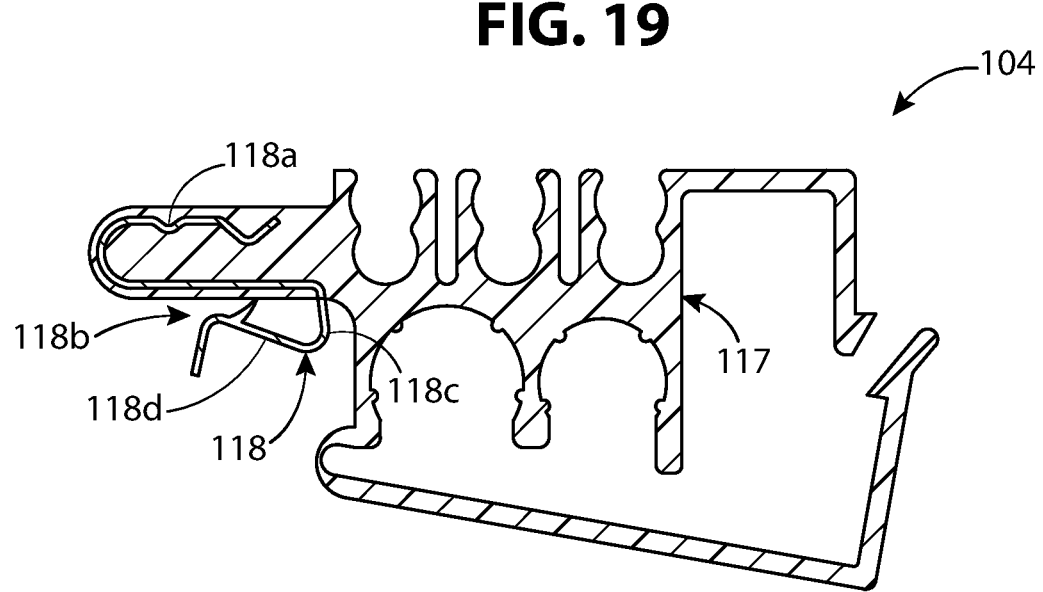
FIG. 20 illustrates, a section view of the wire management clip taken along section lines 20-20 in FIG. 19.
Figure 21:
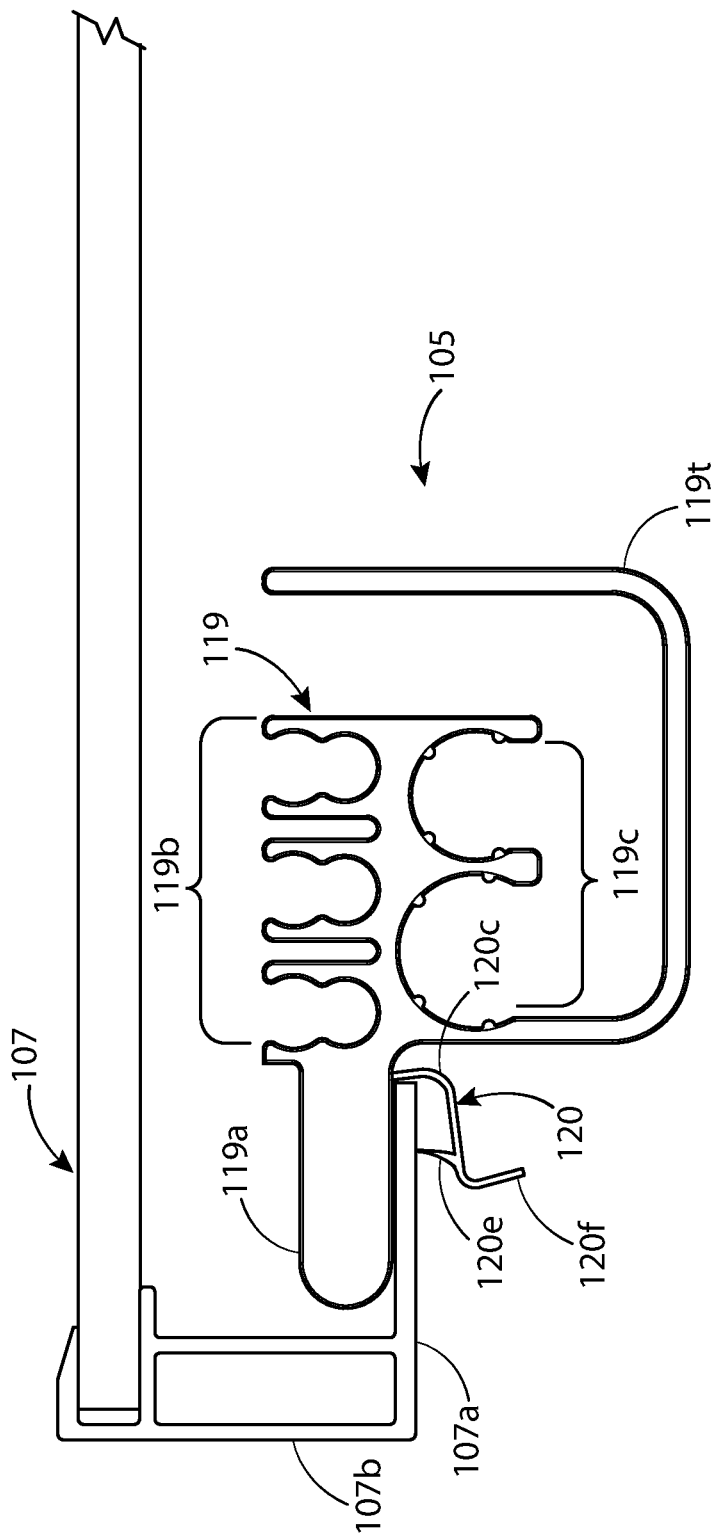
FIG. 21 illustrates, in side view, a third example of a wire management clip mounted to the return flange of a solar panel, with the solar panel cutaway to show the wire management clip.

The wire management clip 102 of FIGS. 1-4, and 7, wire management clip 103 of FIGS. 8-13, wire management clip 104 of FIGS. 14-20, and wire management clip 105 of FIGS. 21-26 each include a clamp portion that is attachable to a solar panel assembly, such as solar panel assembly 100 of FIG. 1. In FIGS. 3 and 4, the clamping portion includes detenting hook 102c and pivoting hook 102b and in FIG. 3, these clamp the rail 106. In FIG. 8, the clamp portion includes panel retainer 115a and spring clip 116. In FIG. 14, the clamp portion includes panel retainer 117a and spring clip 118. In FIG. 21, the clamp portion includes panel retainer 119a and spring clip 120. In FIGS. 8, 14, and 21, the respective clamp portions attach the wire management clips to the return flange of the solar panel.

The wire management clips include one or more plurality of wire channels. In FIG. 4, wire management clip 102 is illustrated to include three plurality of wire channels. In the other examples, the wire management clips are each illustrated to include two plurality of wire channels although they are not limited to this number.

In each of these examples, one or more of the wire channels of a plurality of wire channels is spaced apart a pre-determined distance. In each of these examples, one or more wire channels in each plurality of wire channels could be spaced apart a different pre-determined distance then the other plurality of wire channels. For example, the first plurality of wire channels could include wires that are spaced apart a first pre-determined distance and the second plurality of wire channels could include wires that are spaced apart a second pre-determined distance. The first pre-determined distance and the second pre-determined distance could be the same or could be different.

In each of the examples, each plurality of wire channels within a wire management clip, includes wire channels that are sized differently than the other plurality of wire channels. This can help the installer organize cables and wires by type and helps make servicing and troubleshooting easier.

In each of the examples, each plurality of wire channels within the wire management clip are shown facing a different orientation than the other. In addition, each plurality of wire channels within a wire management clip is shown as co-planar. Making each plurality of wire channels co-planar allows the wires to be routed in the same direction along the solar panel assembly as illustrated in FIG. 1.

EXAMPLES

This section discusses four examples of wire management clips of this disclosure, wire management clip 102 illustrated in FIGS. 1-4, and 7. Wire management clip 103 is illustrated in FIGS. 8-13, wire management clip 104 is illustrated in FIGS. 14-20, and wire management clip 105 is illustrated in FIGS. 21-26. As shown in the General Principles section, these examples include non-mutually exclusive elements. Many of the features described for one of the examples can be applied to the other examples. The Conclusion section discusses examples of such potential combinations of features.

FIGS. 2-4 and 7 illustrate a first example of a wire management clip 102. FIGS. 2 and 3 illustrates the wire management clip 102 secured to the rail 106 of the solar panel assembly 100 from FIG. 1. For simplicity, only a portion of the rail 106 is shown in FIG. 2.

Referring to FIGS. 2 and 3, the rail 106, as illustrated, includes a rail side 106a with a detent 106b, a rail top 106c, a rail bottom 106d, and a rail slot 106e. The rail slot 106e extends lengthwise along the rail top 106c. The wire management clip 102, as illustrated, includes an upper arm 102a, a lower arm 102d, and a plurality of wire channels positioned within the body 102hh of the wire management clip 102. The body 102hh is positioned between the upper arm 102a and lower arm 102d. The upper arm 102a includes a pivoting hook 102b and a detenting hook 102c. The pivoting hook 102b extends from the end of the upper arm 102a. The detenting hook 102c extends from the base of the upper arm 102a. In FIG. 3, the upper arm extends from the body 102hh of the wire management clip 102. Referring to FIGS. 2 and 3, with the wire management clip 102 being secured to the rail 106, the upper arm 102a is so structured and arranged with respect to the body that with the wire management clip being secured to the rail, the upper arm engages and secures to two or more faces of the rail. In this case, the upper arm 102a is so structured and arranged that the pivoting hook 102b engages the rail slot 106e on one face of the rail, i.e. rail top 106c, the detenting hook 102c engages the detent 106b on another face of the rail, i.e., rail side 106a, and the lower arm 102d engages the rail bottom 106d.

Some or all of the wire channels within the plurality of wire channels can be spaced apart a pre-determined distance. For example, referring to FIGS. 3, 4, and 7, the plurality of wire channels, as illustrated, include a first plurality of wire channels 102f and a second plurality of wire channels 102g. Referring to FIGS. 3 and 4, the first plurality of wire channels 102f includes wire channel 102h and wire channel 102i spaced apart by a common wire channel wall, wire channel wall 102j. The second plurality of wire channels 102g includes stacked wire channel 102k, stacked wire channel 102m, stacked wire channel 102n, and stacked wire channel 102o. The first plurality of wire channels 102f can have wire apertures of a first size. The second plurality of wire channels 102g can have wire apertures of a second size to allow the wire channels to accommodate different size and types of wires. In the illustrated example, wire channel 102h and wire channel 102i of the first plurality of wire channels 102f are larger than the wire channels within the second plurality of wire channels 102g. Note that wire channel 102h and wire channel 102i can be the same size or different sizes as is illustrated in FIGS. 3 and 4.

Referring to FIG. 4, the stacked wire channels are spaced apart from each other by wire channel walls and gaps between the wire channel walls. For example, stacked wire channel 102m includes wire channel wall 102p and stacked wire channel 102n includes wire channel wall 102r. Wire channel wall 102p and wire channel wall 102r are separated by a gap 102q. This arrangement allows the wire channel walls to flex independently of each other.

The stacked wire channels are illustrated with two wire channels stacked serially under a common opening and separated by a wire channel detent. For clarity and to avoid confusion, wire channels within a stacked wire channel will be called "wire apertures." FIG. 5 shows an enlarged view of stacked wire channel 102o. Referring to FIG. 5, wire aperture 102s and wire aperture 102t are separated by wire channel detent 102u and wire channel detent 102v. Wire channel detent 102u and wire channel detent 102v are formed from the apex where wire aperture 102s and wire aperture 102t meet. The shape and position of the wire channel detents help to separate wires within wire aperture 102s and wire aperture 102t by spring tension.

Referring to FIGS. 3 and 4, wire channel 102h and wire channel 102i are illustrated including wire channel detents, which use spring tension to help hold wires or cables within their respective wire channels. FIG. 6 illustrates an enlarged portion of wire channel 102h with wire channel detent 102w, wire channel detent 102x, wire channel detent 102y, and wire channel detent 102z. These detents project from the interior perimeter of wire channel 102h and toward its center. While four wire channel detents are illustrated, the ideal number of detents will depend on the hardness of the material (for example, Shore durometer hardness) and size of the opening.

Referring to FIGS. 4 and 7, the detenting hook 102c can be located at the upper arm base 102e. The base of the upper arm being the portion of the upper arm 102a adjacent to the plurality of wire channels. The pivoting hook 102b is located at the end of the upper arm 102a that is away from (i.e., distal from) the upper arm base 102e. Referring to FIGS. 2 and 3, the detenting hook 102c and pivoting hook 102b are so shaped and arranged that with the wire management clip 102 being secured to the rail 106, the wire management clip 102 resists downward rotational movement but allows for removal from the rail by upward rotational movement. Referring to FIGS. 3, 4, and 7, the pivoting hook includes a catch 102aa that extends away from pivoting hook 102b and the upper arm 102a. The detenting hook 102c can extend away from the upper arm base 102e. As an example, the detenting hook 102c is shown extending upward and away followed by downward and toward the upper arm base 102e.

Referring to FIG. 3, the clamp portion resists downward rotational movement, such as downward rotational torque caused by the weight of the wires. The detenting hook 102c positioned in the detent 106b, and the catch 102aa positioned against the rail slot inside lip 106f, resist direct downward force and downward rotational movement as well as direct upward movement. Typically, lift force from storm winds would cause direct upward movement. However, the wire management clip 102 can easily be removed for service or maintenance by rotating it upward and away from the rail 106, releasing the detenting hook 102c from the detent 106b, from catch 102aa from the lip 106f and moving the lower arm 102d away from the rail bottom 106d.

Referring to FIGS. 3, 4, and 7, the lower arm 102d can include detented portions that help grip the rail bottom 106d, for example the detented portion 102bb and detented portion 102cc.

Referring to FIGS. 3, 4, and 7, the wire management clip 102 can include an additional wire channel, or an additional plurality of wire channels, that are located in a different orientation than either the first plurality of wire channels 102f, or the second plurality of wire channels 102g; for example, a third plurality of wire channels 102dd. The third plurality of wire channels 102dd that include wire channel 102ee and wire channel 102ff. The third plurality of wire channels 102dd is oriented 90 degrees clockwise from the first plurality of wire channels 102f and is oriented 90 degrees counterclockwise from the second plurality of wire channels 102g.

Referring to FIG. 4, wire channel 102ee and wire channel 102ff are separated by a wire channel wall 102gg. The wire channel 102ee and wire channel 102ff are so shaped as to hold the wires in by spring tension. In this example they are shaped so that the opening is smaller than the diameter of the wire channel. While two wire channels are shown for the plurality of wire channels 102dd, the plurality of wire channels 102dd could be extended to three or more wire channels.

Note that the first plurality of wire channels 102f, the second plurality of wire channels 102g, and the third plurality of wire channels 102dd are shown all located in the same plane (i.e., they are all co-planar). This allows all of the wires managed by the wire management clip 102 to run in the same direction. Referring to FIGS. 1 and 2, in this case, the co-planar orientation of the wire channels allows the wires to run along the length of the rail (i.e., lengthwise along the rail).

The wire management clip 102 can work with other rails and is not limited to the rail 106 of FIGS. 2 and 3 as shown. Rail 106 could alternatively be a rail with grooved sides and with a rail slot positioned lengthwise along the top of the rail. The detenting hook 102c of FIGS. 2-5 can be extended to catch the grooved sides. For the purposes of this disclosure, when referring to a "detent" in a rail side, this can also include a rail slot or rail groove, since rail slots and rail grooves can function as detents.

FIGS. 8-13 illustrate a second example of a wire management clip of this disclosure, wire management clip 103. Referring to FIG. 8, the wire management clip 103 is illustrated attached to the return flange 107a of solar panel frame 107b of solar panel 107. Referring to FIGS. 8-13, the wire management clip 103 comprises a wire clip body 115 and a spring clip 116. Referring to FIG. 8, the spring clip 116 is secured to the wire clip body 115 and is sized and shaped to secure the wire management clip 103 to the return flange 107a. Referring to FIG. 13, a portion of the spring clip 116 (i.e., the spring clip base portion 116a) can be embedded in the wire clip body 115 to secure the spring clip 116 to the wire clip body 115. The spring clip base portion 116a can be so shaped as to prevent pullout from the wire clip body 115. The spring clip 116 could be serpentine shaped, s-shaped, or any other shape that would help prevent pullout. For example, as illustrated, the spring clip 116 is s-shaped, with the spring clip base portion 116a forming the bottom of the s-shape. The spring clip upper portion 116b, which includes a spring clip side 116c and spring clip top 116d form the top of the s-shape.

Referring to FIG. 8, the spring clip 116 can also include a barb 116e positioned between the spring clip end 116f and the spring clip side 116c. With the spring clip 116 lifted by the spring clip end 116f, the return flange 107a can be positioned between the spring clip 116 and the panel retainer 115a of the wire clip body 115. With the spring clip end 116f released, the barb 116e can press against the return flange 107a. The return flange 107a, in turn, will press against the panel retainer 115a, to secure the solar panel 107 to the wire management clip 103. In order to help resist removal of the wire management clip 103 from the return flange 107a, the tip of the barb 116e can face the spring clip side 116c.

The spring clip 116 can be made of metal such as spring steel and the wire clip body 115 could be made of a non-metallic material, such as from molded plastic. Referring to FIG. 13, the spring clip base portion 116a could be embedded in the wire clip body 115, while the wire clip body 115 is being molded, extruded, 3D-printed, or otherwise formed. The wire clip body 115 could be molded, extruded, or otherwise formed out of a material with a Shore durometer optimized for both flexibility and strength. The spring clip 116 could be optimized for spring tension and strength. Alternatively, both the spring clip 116 and the wire clip body 115 could both be made of metal and integrally formed by extrusion or casting.

Figure 9:
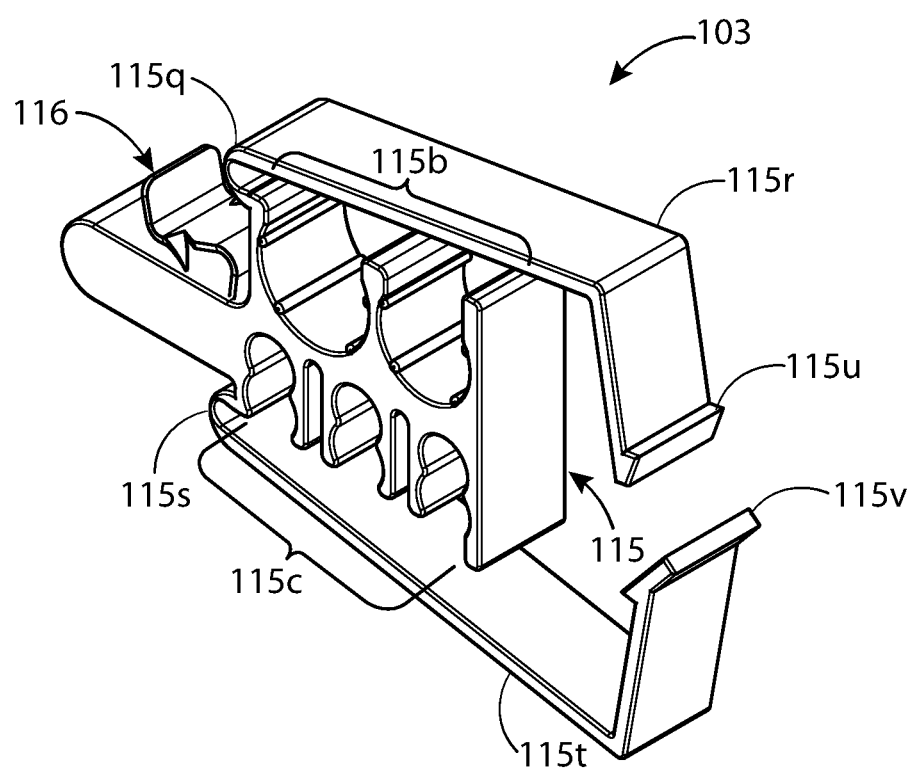
FIG. 9 illustrates, in top and front isometric view, the wire management clip of FIG. 8.
Figure 10:
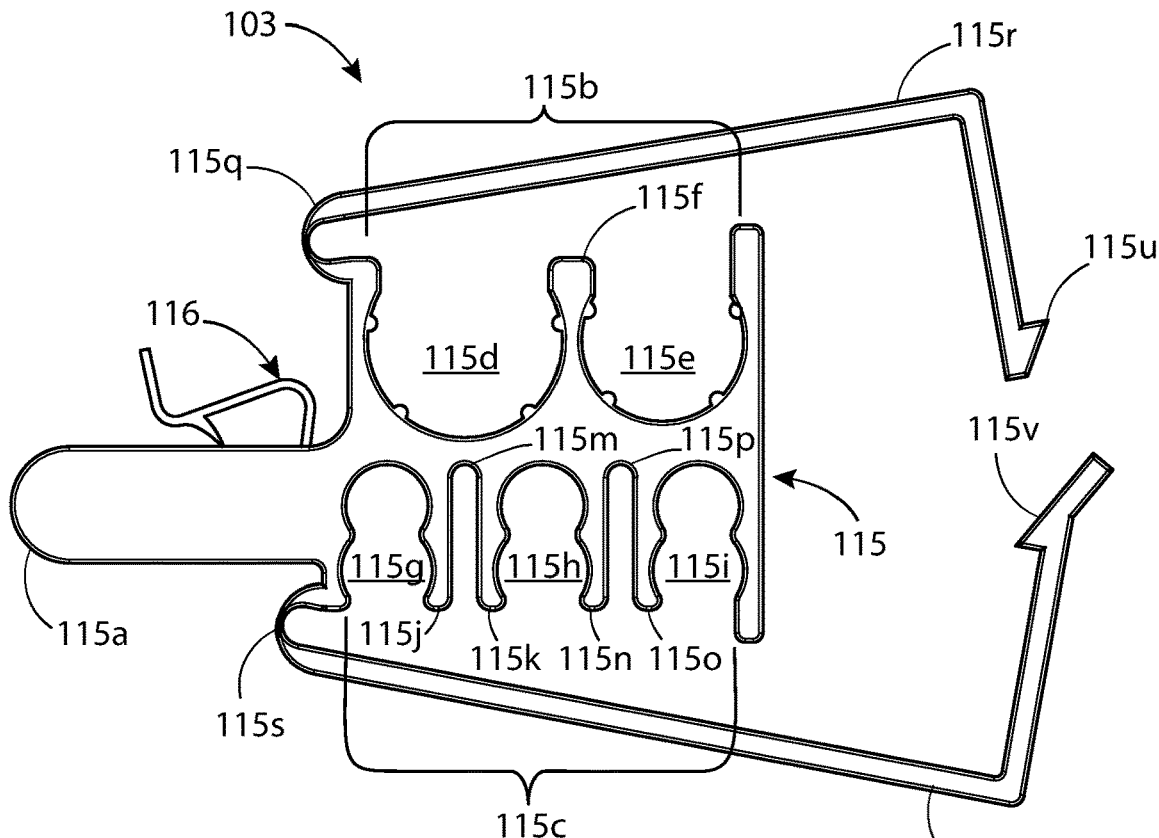
FIG. 10 illustrates, in side view, the wire management clip of FIG. 8 with the latch arms open.
Figure 11:
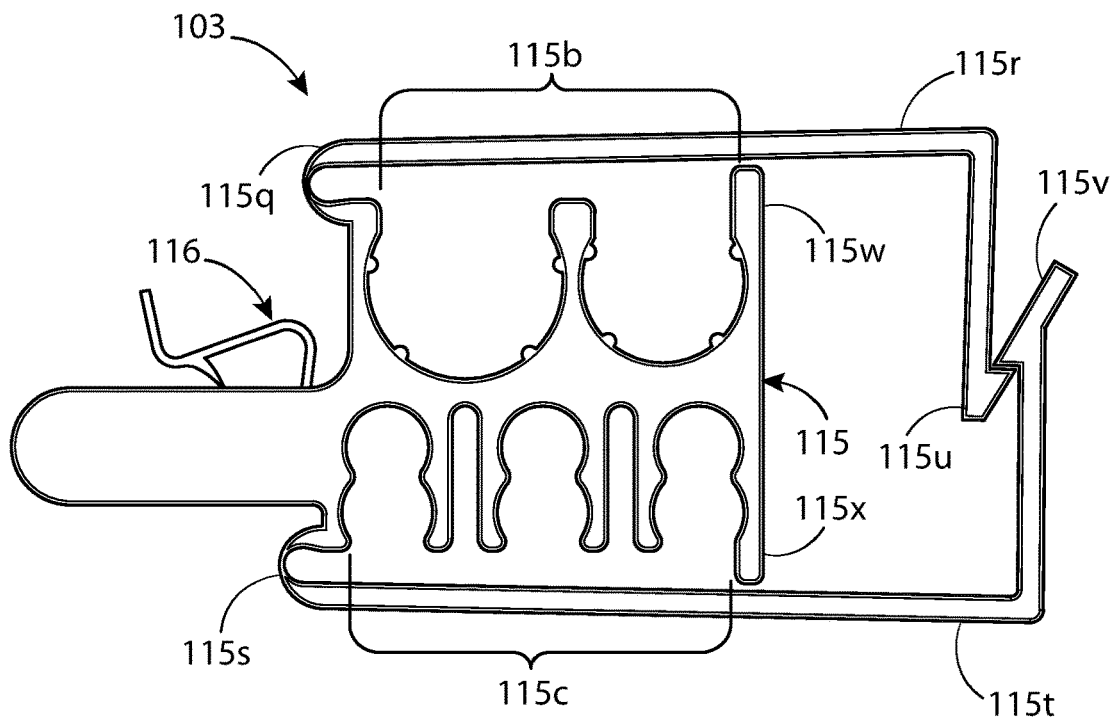
FIG. 11 illustrates, in side view, the wire management clip of FIG. 10 with the latch arms closed.
Figure 12:
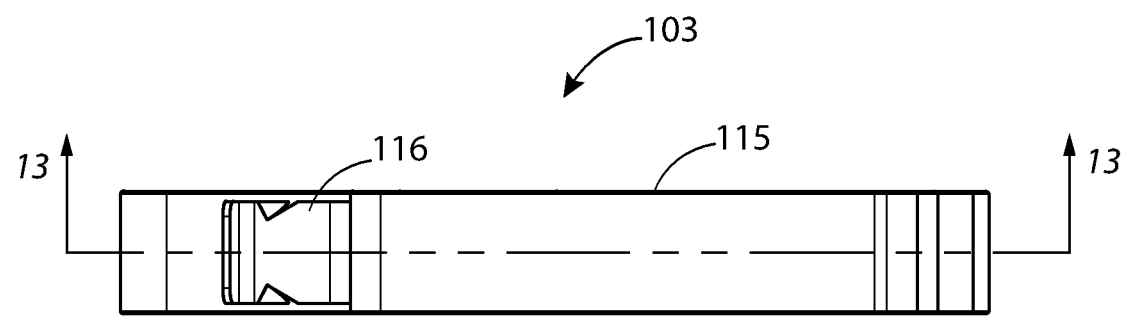
FIG. 12 illustrates, in top view, the wire management clip of FIG. 8.

Referring to FIGS. 9-11, the wire clip body 115 includes a first plurality of wire channels 115b, where some or all of the wire channels within the first plurality of wire channels 115b can be spaced apart a pre-determined distance. The wire clip body 115 can also include a second plurality of wire channels 115c, such as the one illustrated, where some or all of the wire channels within the wire channels 115c are spaced apart a different pre-determined distance. In addition, the first plurality of wire channels 115b can be oriented in one direction and the second plurality of wire channels can be oriented in a different direction.

For example, referring to FIG. 10, the first plurality of wire channels 115b, as illustrated, include wire channel 115d and wire channel 115e spaced apart by a common wall, wire channel wall 115f. The second plurality of wire channels 115c, as illustrated, includes stacked wire channel 115g, stacked wire channel 115h, and stacked wire channel 115i. Stacked wire channel 115g and stacked wire channel 115h are spaced apart from each other by wire channel wall 115j and wire channel wall 115k with a gap 115m. Similarly, the stacked wire channel 115h and the stacked wire channel 115i are spaced apart from each other by wire channel wall 115n and wire channel wall 115o and gap 115p. This arrangement allows the wire channel walls to flex independently of each other.

The stacked wire channels are illustrated to include two wire channels (i.e., "wire apertures") stacked next to each other and separated by a wire channel detent was previously described for FIG. 5 with the shape and position of the wire channel detents helping to separate wires within the stacked wire channels by spring tension. Wire channel 115d and wire channel 115e can optionally include detents to help hold wires within the wire channel by spring tension. Similar detents were previously described for the example in FIGS. 3 and 4.

As illustrated, the first plurality of wire channels 115b is oriented in the opposite direction (i.e., 180 degrees) from the second plurality of wire channels 115c but in the same plane (i.e., are co-planar). This allows the wires and cables passing through the wire channels to all be oriented in the same direction. The first plurality of wire channels 115b can have apertures of first size and second plurality of wire channels 115c can have apertures of a second size to allow the wire channels to accommodate different sizes and types of wires.

The panel retainer 115a projects away from the first plurality of wire channels 115b, the second plurality of wire channels 115c, the upper hinge arm 115r and the lower hinge arm 115t.

The wire management clip 103 can include one or more living hinges attached to arms that cover one or more of the plurality of wire channels. Referring to FIGS. 9-11, the wire clip body 115 can include a first living hinge 115q and an upper hinge arm 115r attached to and made movable by the first living hinge 115q. The wire clip body 115 can include second living hinge 115s and a lower hinge arm 115t attached to and made movable by the second living hinge 115s. The upper hinge arm 115r can include a first latch 115u and the lower hinge arm 115t can include a second latch 115v. A living hinge allows the wire management clip to be molded, 3D printed, or otherwise formed from one piece of material. There may be circumstances where it is desirable for the upper hinge arm 115r or lower hinge arm 115t to be separable from the wire clip body 115 of the wire management clip 103. In this case, a conventional hinge could be used in place of the living hinge.

Referring to FIG. 11, with the upper hinge arm 115r is latchable to the lower hinge arm 115t, as illustrated, by the first latch 115u and the second latch 115v. When latched, the upper hinge arm 115r covers the first plurality of wire channels 115b. The lower hinge arm 115t covers the second plurality of wire channels 115c. Optionally, mechanical stops can prevent overclosure and reduce play in the latches. For example, mechanical stop 115w and mechanical stop 115x prevent overclosure of upper hinge arm 115r and lower hinge arm 115t. Mechanical stop 115w projects upward from the first plurality of wire channels 115b. Mechanical stop 115x projects downward (i.e., away from the opening of) from the second plurality of wire channels 115c.

FIGS. 14-20 illustrate a third example of a wire management clip of this disclosure, wire management clip 104. The wire management clip 104 comprises a wire clip body 117 and a spring clip 118. Referring to FIG. 14, the wire management clip 104 is illustrated attached to the return flange 107a of solar panel frame 107b of solar panel 107. The spring clip 118 and panel retainer 117a secure and retain the wire management clip 104 to the return flange 107a.

Figure 17:
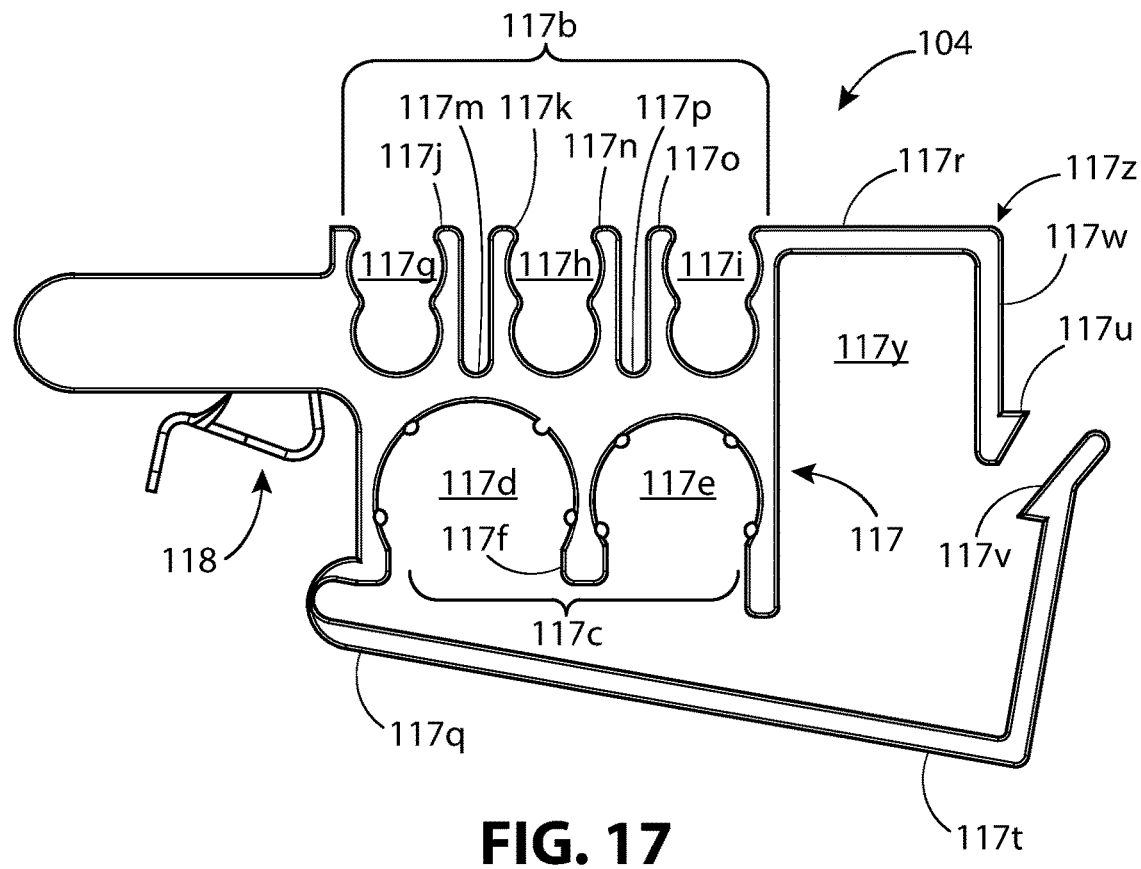
FIG. 17 illustrates, in side view, the wire management clip of FIG. 14 with the latch arm open.
Figure 18:
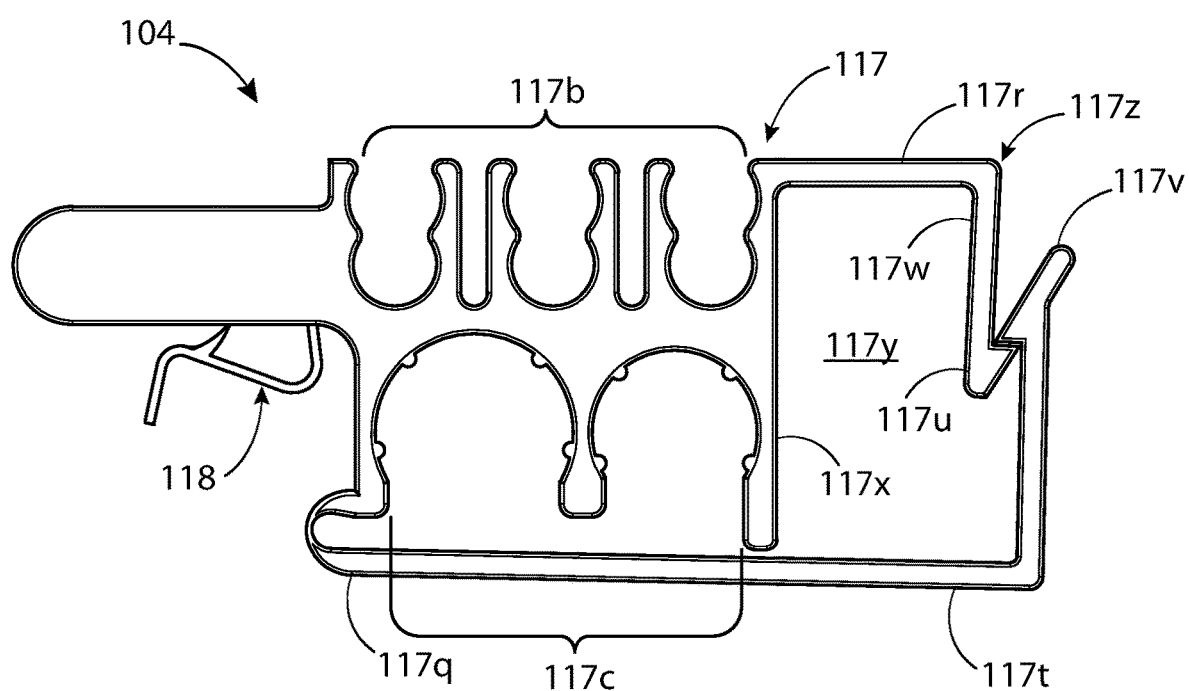
FIG. 18 illustrates, in side view, the wire management clip of FIG. 14 with the latch arm closed.
Figure 19:
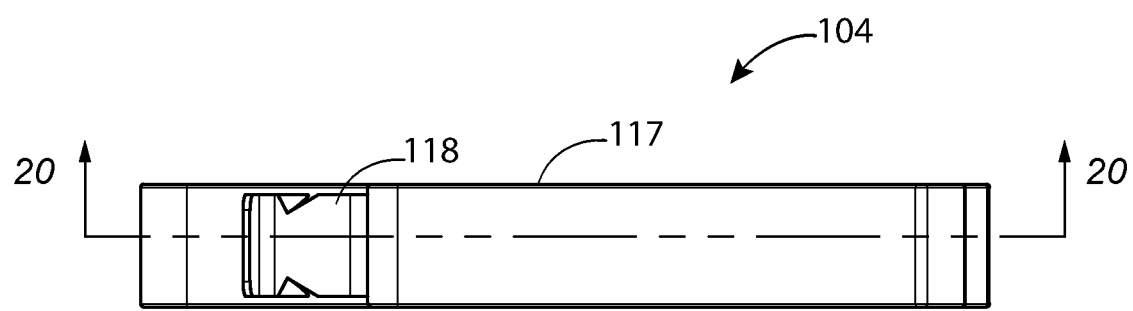
FIG. 19 illustrates, in top view, the wire management clip of FIG. 14.

In contrast to the second example (i.e., FIGS. 8-13), referring to FIGS. 14-18, the first plurality of wire channels 117b is not covered by an upper hinge arm. The second plurality of wire channels 117c is covered by a lower hinge arm 117t. The lower hinge arm 117t pivots by a living hinge 117q. Referring to FIGS. 14, 17, and 18, the lower hinge arm 117t is latchable to a wire cavity body 117z that surrounds a wire cavity 117y. Referring to FIGS. 14-18, the lower hinge arm 117t includes a second latch 117v that extends from the end of the lower hinge arm 117t. The second latch 117v latches to a first latch 117u. Referring back to FIGS. 14, 17, and 18, the first latch 117u extends from the end of the wire cavity body 117z.

Referring to FIGS. 17 and 18, the wire cavity body 117z, as illustrated, is u-shaped and can comprise a wire cavity top 117r and a wire cavity outside wall 117w. The wire cavity top 117r extends from the first plurality of wire channels 117b. The wire cavity outside wall 117w extends downward from the wire cavity top 117r. Referring to FIG. 18, with the second latch 117v secured to the first latch 117u, the wire cavity 117y extends between the wire cavity top 117r, the wire cavity inside wall 117x, the wire cavity outside wall 117w, and the lower hinge arm 117t.

Referring to FIGS. 14-18, the wire management clip 104 includes features similar to the wire management clip 103 of FIGS. 8-13. For example, the first plurality of wire channels 117b and the second plurality of wire channels 117c can be co-planar but oriented in different directions as previously discussed.

Referring to FIG. 17, the second plurality of wire channels 117c, as illustrated, includes wire channel 117d and wire channel 117e spaced apart by a common wall, wire channel wall 117f. The first plurality of wire channels 117b, as illustrated, includes stacked wire channel 117g, stacked wire channel 117h, and stacked wire channel 117i. Wire channels within the stacked wire channels can be spaced apart as was described for FIG. 5. Stacked wire channel 117g and stacked wire channel 117h are spaced apart from each other by wire channel wall 117j and wire channel wall 117k with a gap 117m. Similarly, the stacked wire channel 117h and the stacked wire channel 117i are spaced apart from each other by wire channel wall 117n and wire channel wall 117o and gap 117p. This arrangement allows the wire channel walls to flex independently of each other.

Referring to FIG. 20, the spring clip 118 can be embedded into the wire clip body 117, shaped to prevent pull-out, and made of materials or material combinations as previously described. In this example, the spring clip 118 is s-shaped, with the spring clip top portion 118a forming the top of the s-shape. The spring clip lower portion 118b, which includes a spring clip side 118c and spring clip bottom 118d, form the bottom of the s-shape.

Figure 22:
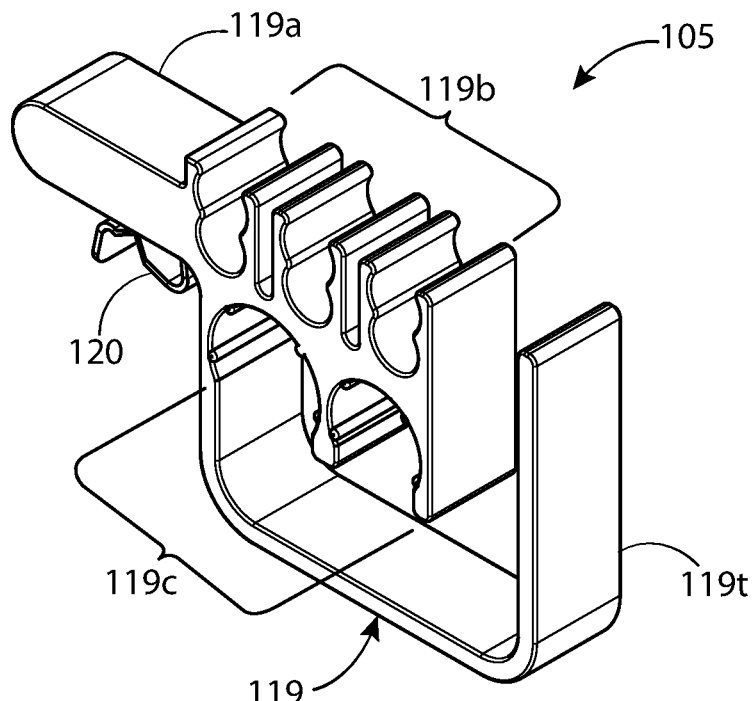
FIG. 22 illustrates, in top and front isometric view, the wire management clip of FIG. 21.
Figure 23:
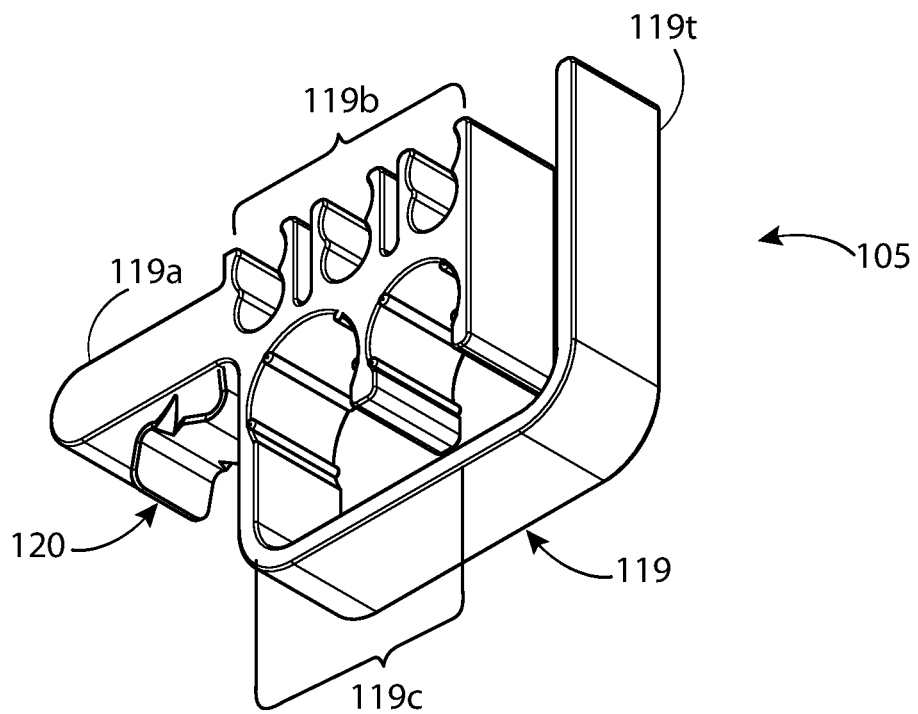
FIG. 23 illustrates, in bottom and front isometric view, the wire management clip of FIG. 22.
Figure 24:
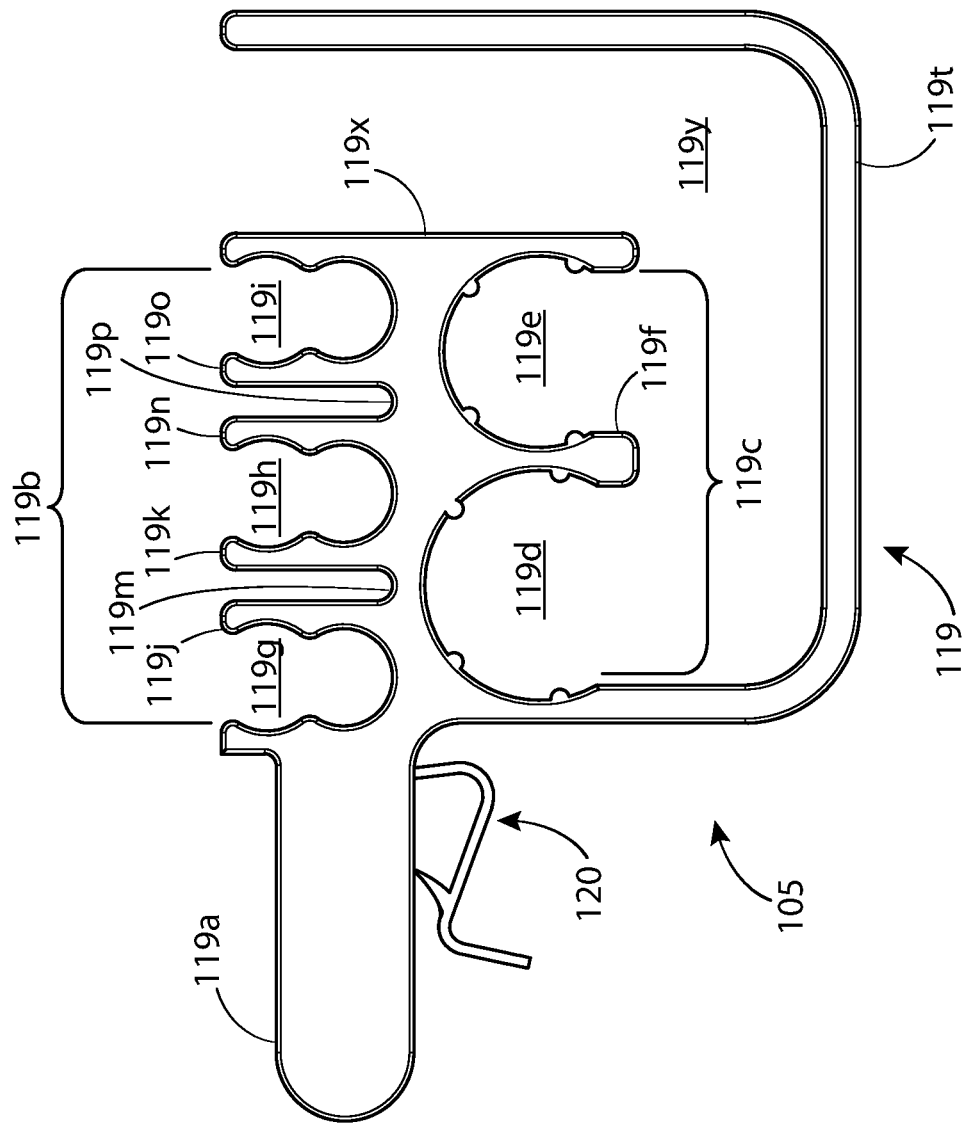
FIG. 24 illustrates, in side view, the wire management clip of FIG. 21.
Figure 25:
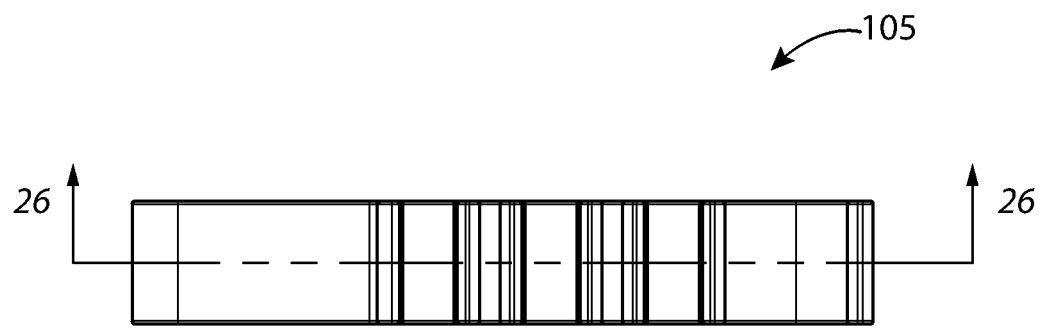
FIG. 25 illustrates, in top view, the wire management clip of FIG. 21.

FIGS. 21-26 illustrate a forth example of a wire management clip of this disclosure, wire management clip 105. This wire management clip does not have hinge arms or latches. Referring to FIGS. 21-24, instead, extra wires and cables can be accommodated by a wire cavity that is formed by a lower arm 119t. Referring to FIG. 24, the lower arm 119t can take on a modified u-shape. The lower arm 119t can wrap around the bottom of the second plurality of wire channels 119c and a wall 119x to form the wire cavity 119y.

As illustrated, the wire management clip 105 of FIGS. 21-26 and the wire management clip 104 of FIGS. 14-20 have many similarities. Referring to FIG. 21, the wire management clip 105 can attach to the return flange 107a of solar panel frame 107b of solar panel 107. The return flange 107a is positioned between a spring clip 120 and a panel retainer 119a. The panel retainer 119a extends from the wire clip body 119. The panel retainer 119a, the first plurality of wire channels 119b, and the second plurality of wire channels 119c form portions of wire clip body 119. The spring clip 120 can also include a barb 120e positioned between the spring clip end 120f and the spring clip side 120c and to secures the wire management clip 105 to the return flange 107a as previously discussed.

Figure 26:
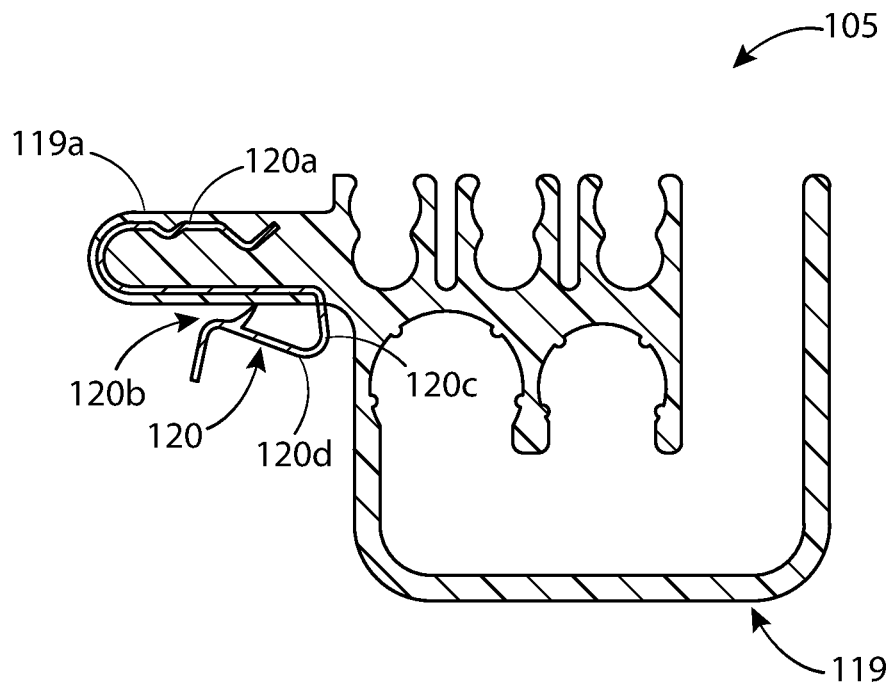
FIG. 26 illustrates, a section view of the wire management clip taken along section lines 26-26 in FIG. 25.

Referring to FIG. 26, the spring clip 120 can be embedded into the panel retainer 119a of the wire clip body 119, shaped to prevent pull-out, and made of materials or material combinations as previously described. In this example, the spring clip 120 is s-shaped, with the spring clip top portion 120a forming the top of the s-shape. The spring clip lower portion 120b, which includes a spring clip side 120c and spring clip bottom 120d, form the bottom of the s-shape. The spring clip 120 and the panel retainer are also illustrated in FIGS. 22-24.

Referring to FIG. 24, the first plurality of wire channels 119*b* and the second plurality of wire channels 119*c* of the wire clip body 119 can be co-planar but oriented in different directions as previously discussed. The second plurality of wire channels 119*c*, as illustrated, include wire channel 119*d* and wire channel 119*e* spaced apart by a common wall, wire channel wall 119*f*. The first plurality of wire channels 119*b*, as illustrated, includes stacked wire channel 119*g*, stacked wire channel 119*h*, and stacked wire channel 119*i*. Wire channels within the stacked wire channels can be spaced apart as was described for FIG. 17. Stacked wire channel 119*g* and stacked wire channel 119*h* are spaced apart from each other by wire channel wall 119*j*, wire channel wall 119*k*, and gap 119*m*. Similarly, the stacked wire channel 119*h* and the stacked wire channel 119*i* are spaced apart from each other by wire channel wall 119*n* and wire channel wall 119*o* and gap 119*p*. This arrangement allows the wire channel walls to flex independently of each other.

Figure 27:
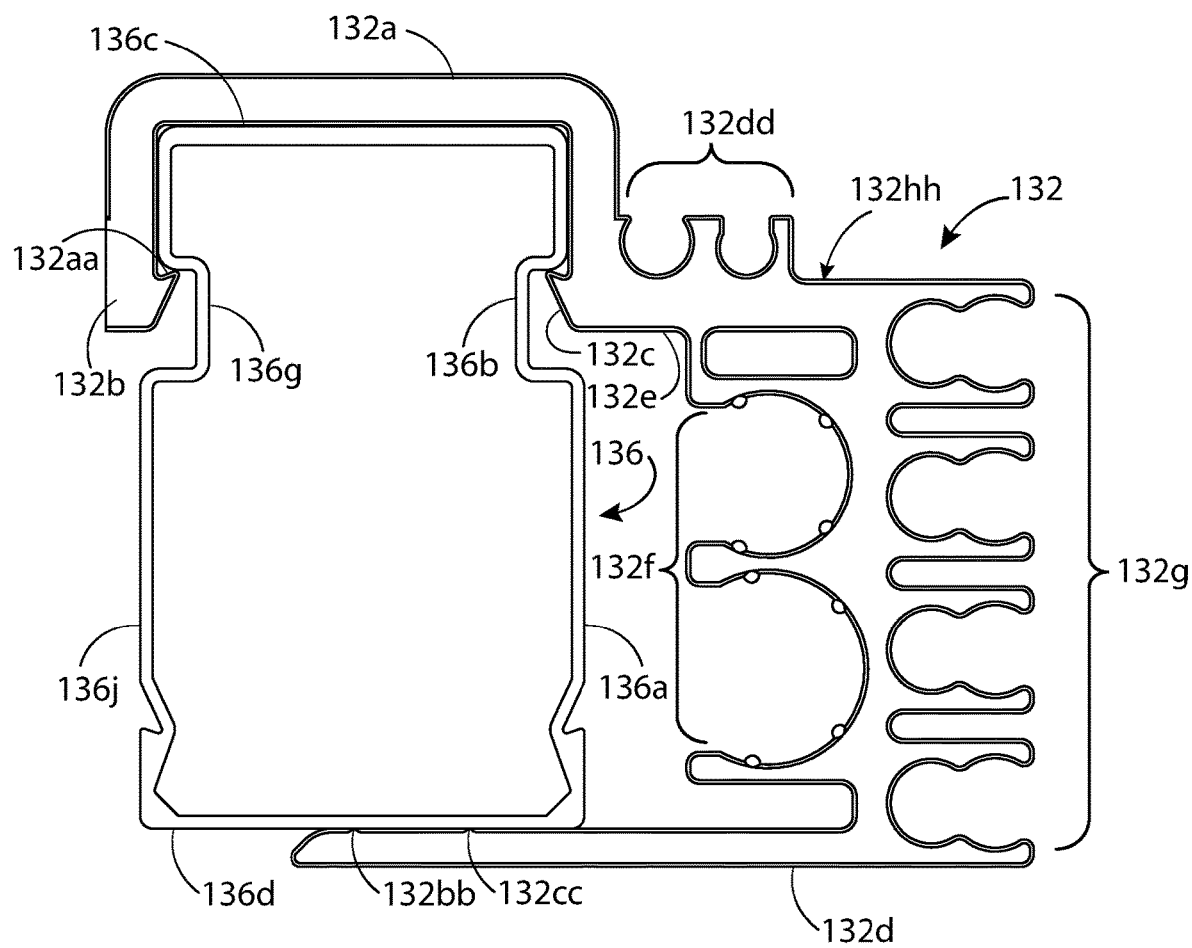
FIG. 27 illustrates a wire management clip secured to a rail with rectangular slots.
Figure 28:
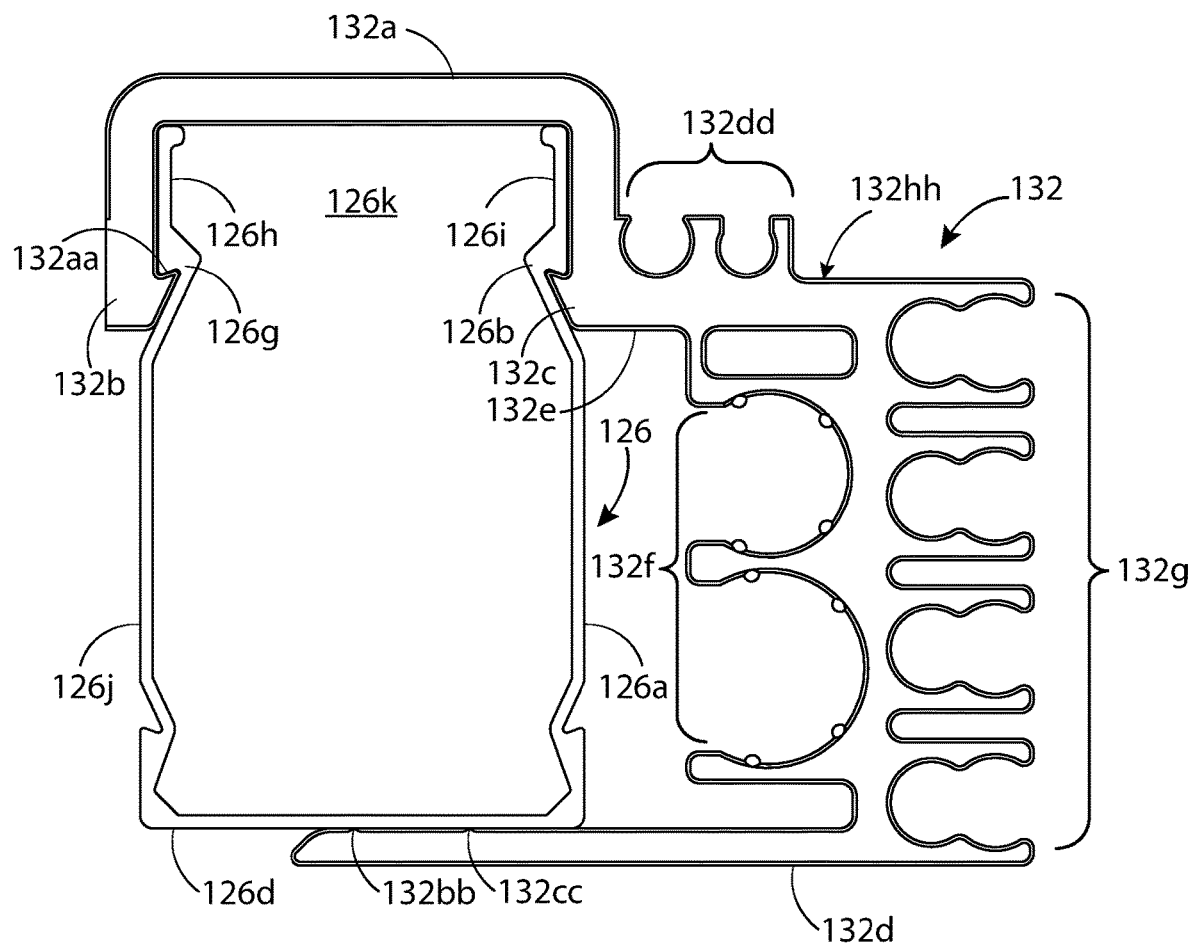
FIG. 28 illustrates the wire management clip of FIG. 27, secured to a rail with an open top.
Figure 29:
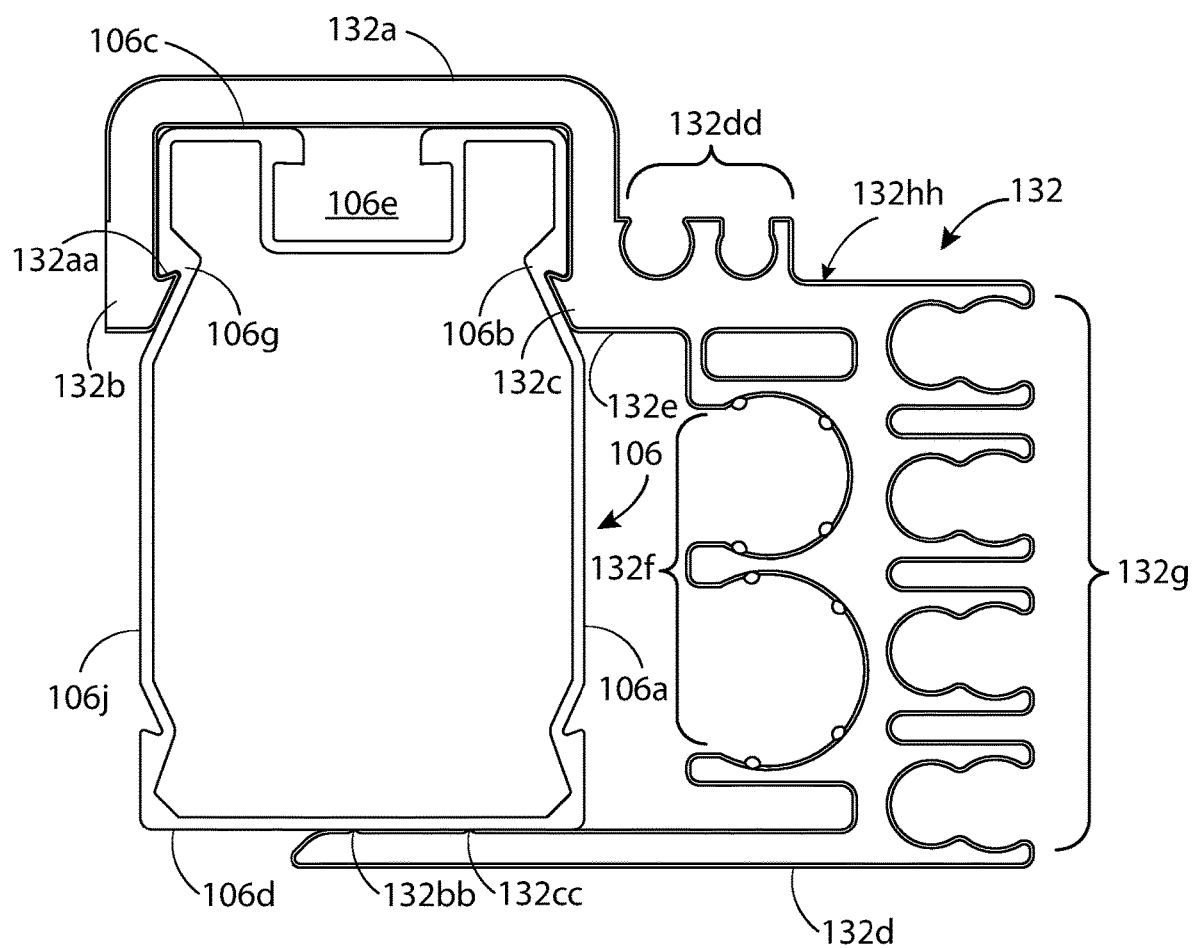
FIG. 29 illustrates the wire management clip of FIG. 27, secured to the rail from FIG. 3.

FIGS. 27-31 illustrate another example of a rail-mounted wire management clip, wire management clip 132. Wire management clip 132 does not depend on a rail slot for securing itself to a rail. As an example, FIGS. 27, 28, and 29 illustrate the wire management clip 132 secured to two or more faces of rail 136, rail 126, and rail 106, respectively. The wire management clip 132 secures to detents on opposite sides of the rail. This is in contrast to FIGS. 2 and 3 where wire management clip 102 secures to a rail slot on top of the rail and to a detent on one side of the rail.

FIG. 27, illustrates the wire management clip 132 attached to rail 136 with generally rectangular-shaped upper detents, detent 136*b* and detent 136*g*, and a closed top, rail top 136*c*. Detent 136*b* is indented on one face of the rail, in rail side 136*a*. Detent 136*g* is indented in another face of the rail, rail side 136*j*. The rail top 136*c*, in this example, is continuous and does not include a rail slot. FIG. 28, illustrates the wire management clip 132 attached to rail 126 similar to rail 106 of FIG. 3, except rail 126 has an open top (i.e., the rail has three rail faces instead of four). The rail 126 includes detent 126*b* in rail side 126*a* and detent 126*g* in rail side 126*j* that are similar in structure to detent 106*b* described for FIG. 3. FIG. 29, illustrates the wire management clip 132 attached to rail 106 with detent 106*b* in rail side 106*a* and rail slot 106*e* as previously described. FIG. 29 also shows detent 106*g* in the rail side 106*j*. Rail 106 is the same rail as shown in FIG. 3.

Referring to FIGS. 27-29, the wire management clip 132 includes a detenting hook 132*c* and a pivoting hook 132*b* with a catch 132*aa*. The detenting hook 132*c* is positioned at the upper arm base 132*e* where the upper arm 132*a* intersects the body 132*hh* of the wire management clip 132. The pivoting hook 132*b* is positioned on the opposite end of the upper arm 132*a*. The pivoting hook 132*b* ends in a catch 132*aa*. In FIG. 27, the detenting hook 132*c* engages the detent 136*b*, the upper arm 132*a* passes over the rail top 136*c*, and the catch 132*aa* of the pivoting hook 132*b* engages the detent 136*g*. The upper arm 132*a* can optionally rest against the rail top 136*c*. In FIG. 28, the detenting hook 132*c* engages the detent 126*b*. The upper arm 132*a* rests against upper rail side 126*i* and the upper rail side 126*h* and passes over the open cavity 126*k*. The open cavity is positioned between the upper rail side 126*i* and the upper rail side 126*h*. The upper rail side 126*i* is positioned above the detent 126*b* and the upper rail side 126*h* is positioned above the detent 126*g*. The catch 132*aa* of the pivoting hook 132*b* engages the detent 126*g*. In FIG. 29, the detenting hook 132*c* engages the detent 106*b*. The upper arm 132*a* rests against rail top 106*c* as it passes over the rail slot 106*e*. The catch 132*aa* of the pivoting hook 132*b* engages the detent 126*g*.

Referring to FIGS. 27-29, the body of the wire management clip 132 includes second plurality of wire channels 132*g* facing away from the rail side 136*a* (FIG. 27), rail side 126*a* (FIG. 28) and rail side 106*a* (FIG. 29). The body of the wire management clip 132 includes first plurality of wire channels 132*f* facing rail side 136*a* (FIG. 27), rail side 126*a* (FIG. 28), and rail side 106*a* (FIG. 29). In FIGS. 27-29, third plurality of wire channels 132*dd* face upward above first plurality of wire channels 132*f* and second plurality of wire channels 132*g*. The first plurality of wire channels 132*f*, the second plurality of wire channels 132*g*, and the third plurality of wire channels 132*dd* are positioned in the body 132*hh* of the wire management clip 132. A lower arm 132*d* extends from the bottom of the body 132*hh* of the wire management clip 132 toward the rail, in the same direction as the upper arm 132*a* and approximately parallel with the upper arm 132*a*. The lower arm 132*d* engages the rail bottom 136*d* (FIG. 27), rail bottom 126*d* (FIG. 28), and rail bottom 106*d* (FIG. 29). Detented portion 132*bb* and detented portion 132*cc* help create tension between the respective rail bottoms and the lower arm 132*d* to prevent slippage.

Continuing to refer to FIGS. 27-29, the detenting hook 132*c* and pivoting hook 132*b* are so shaped and arranged that with the wire management clip 132 being secured to the rail 136 (FIG. 27), rail 126 (FIG. 28), or rail 106 (FIG. 29), the wire management clip 132 resists downward rotational movement, but allows for removal from the rail by upward rotational movement. The clamp portion resists downward rotational movement, such as downward rotational torque caused by the weight of the wires. The detenting hook 132*c* positioned in the detent 136*b* (FIG. 27), detent 126*b* (FIG. 28) or detent 106*b* (FIG. 29), and the catch 132*aa* positioned against detent 136*g* (FIG. 27) detent 126*g* (FIG. 28), or detent 106*g* (FIG. 29) resists direct downward force and downward rotational movement as well as direct upward movement. Typically, lift force from storm winds would cause direct upward movement. However, the wire management clip 132 can easily be removed for service or maintenance by rotating it upward and away from its respective rail, releasing the detenting hook 132*c* from the respective detent, from catch 102*aa* from its respective detent and moving the lower arm 132*d* away from its respective rail bottom.

Figure 30:
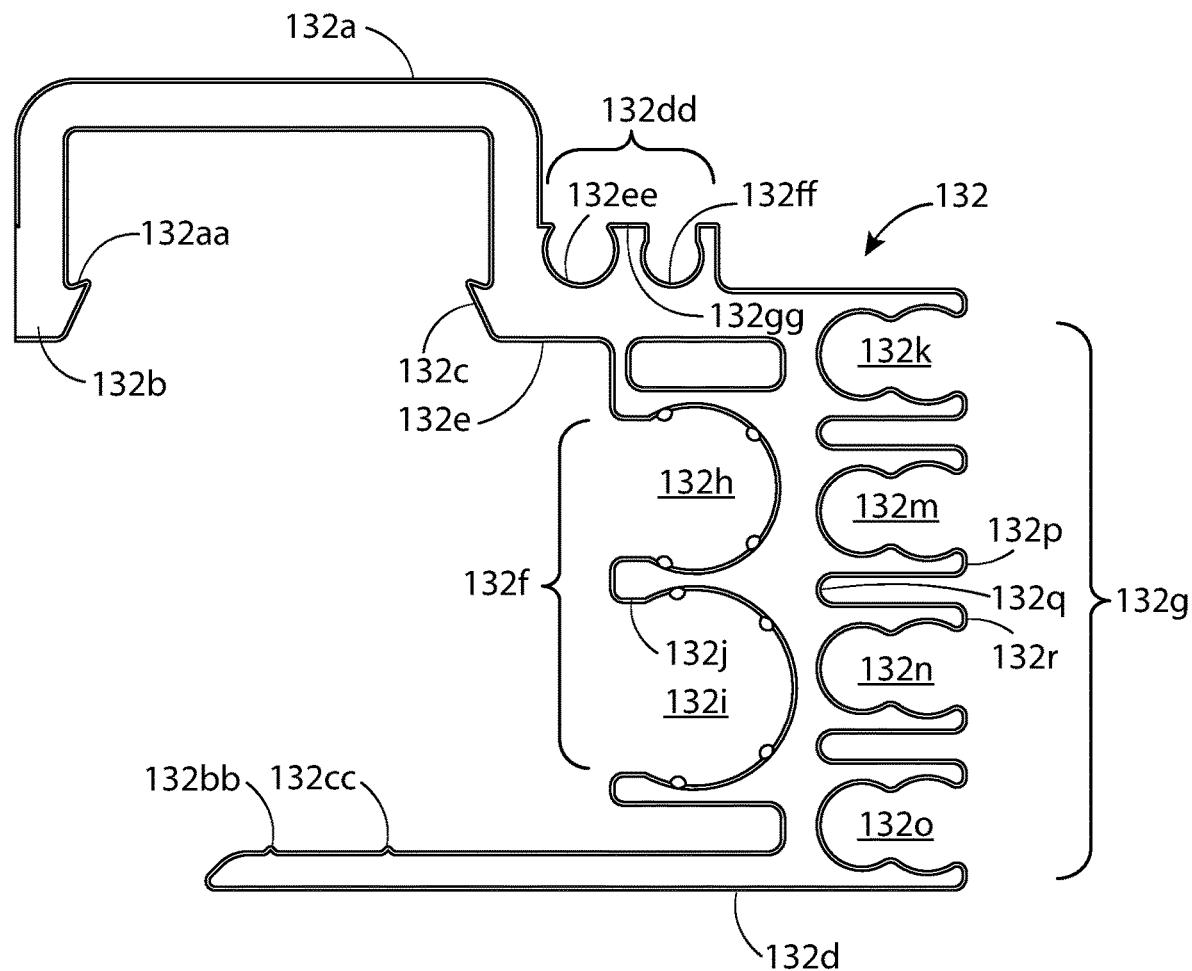
FIG. 30 illustrates, in side view, the wire management clip of FIG. 27.
Figure 31:
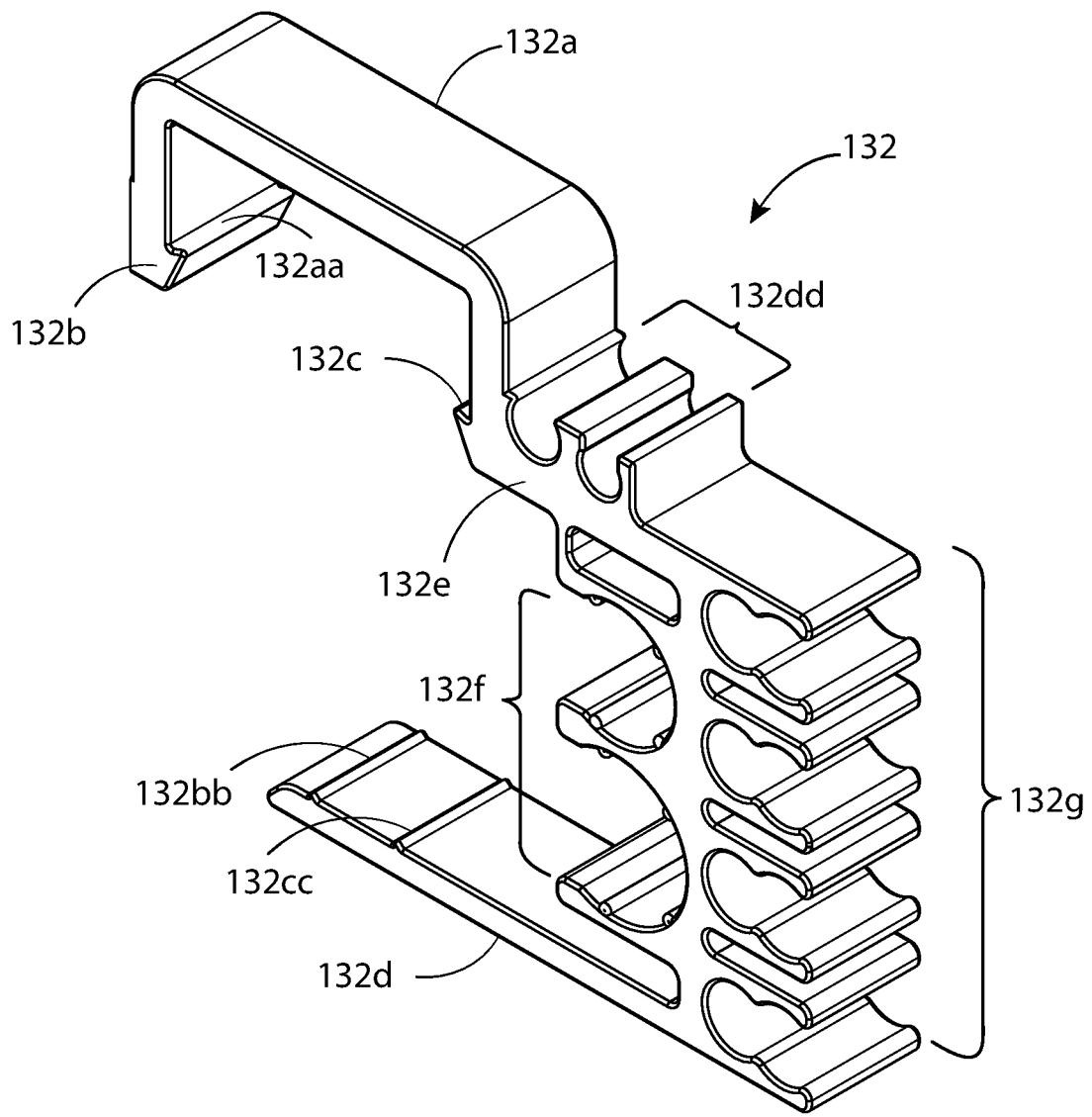
FIG. 31 illustrates, in isometric view, the wire management clip of FIG. 27.

FIGS. 30 and 31 show the wire management clip 132 in side view and isometric view, respectively, and illustrate the structure and relationship between the upper arm 132*a*, pivoting hook 132*b*, the catch 132*aa*, detenting hook 132*c*, lower arm 132*d*, upper arm base 132*e*, third plurality of wire channels 132*dd*, first plurality of wire channels 132*f*, second plurality of wire channels 132*g*, detented portion 132*bb*, and detented portion 132*cc*, as described above.

Referring to FIG. 30, the first plurality of wire channels 132*f*, the second plurality of wire channels 132*g*, and the third plurality of wire channels 132*dd* are illustrated as co-planar. This allows wires and cables managed by the wire management clip 132 to run in the same direction.

Referring to FIG. 30, wire channels of the wire management clip 132 can be structured similar to what was described for the wire management clip 102 of FIG. 4. For example, the first plurality of wire channels 132*f* can include wire channels of different sizes to accommodate different size wires or groupings of wires or cables. In this example, wire channel 132*h* is sized differently from wire channel 132*i* and separated by a wire channel wall 132*j*. The second plurality of wire channels 132g is shown to include stacked wire channels: stacked wire channel 132k, stacked wire channel 132m, stacked wire channel 132n, and stacked wire channel 132o, separated by a pair of wire channel walls with a gap between them. For example, stacked wire channel 132m and stacked wire channel 132n are separated by wire channel wall 102p, wire channel wall 102r with gap 102q between the wire channel walls. The third plurality of wire channels include wire channel 132ee and wire channel 132ff separated by wire channel wall 132gg. The third plurality of wire channels 132dd is positioned at approximately a 90-degree angle with respect to the first plurality of wire channels 132f and the second plurality of wire channels 132g.

CONCLUSION

Described are devices and systems for managing wiring and cables associated with solar panel assemblies. The description is not exhaustive and not exclusive. Examples of devices, components, and configurations are meant to aid the reader in understanding the described general principles. The following are examples of how different components, structures, and features of the wire management clips and resulting wire management systems can be varied while still adhering to the general principles.

The wire management clip 103 of FIG. 8 is shown attached to the return flange 107a of the solar panel frame 107b so that the spring clip 116 extends upward from the panel retainer 115a. The wire management clip 104 of FIG. 14 is shown attached to the return flange 107a of the solar panel frame 107b with the spring clip 118 extending downward from the panel retainer 117a. Depending on the height of the solar panel frame 107b, the wire management clip 103 of FIG. 8 can be turned over so that the spring clip extends downward from the panel retainer 115a. Similarly, the wire management clip 104 of FIG. 14 can be turned over so that spring clip 118 extends upward from the panel retainer 117a.

Referring to FIG. 8, given sufficient clearance from the solar panel substrate 107c for the upper hinge arm 115r to open, the spring clip 116 could be embedded into panel retainer 115a so that it extends downward from the bottom of the panel retainer 115a. Similarly, referring to FIG. 14, given sufficient clearance from the roof 114 for the lower hinge arm 117t to open, the spring clip 118 could be embedded into the panel retainer 117a so that the spring clip 118 extends upward from the bottom of the panel retainer 117a.

The number and size of the wire channels illustrated within the various pluralities of wire channels illustrated throughout this disclosure are merely suggestive of what is possible. The wire management clips can include additional pluralities of wire channels, or fewer pluralities of wire channels. One or more of the plurality of wire channels can include more or fewer wire channels. For example, in FIG. 3, the first plurality of wire channels 102f includes wire channel 102h and wire channel 102i separated by wire channel wall 102j. The first plurality of wire channels 102f could include additional wire channels that could be separated by additional wire channel walls. Likewise, the second plurality of wire channels that include stacked wire channel 102k, stacked wire channel 102m, stacked wire channel 102n, and stacked wire channel 102o, could include additional stacked wire channels or fewer wire channels. Likewise, the third plurality of wire channels 102dd could include more wire channels.

This principle of more or fewer wire channels with one or more of the plurality of wire channels can also be applied to wire management clip 103 of FIGS. 8-13, wire management clip 104 of FIGS. 14-20, and wire management clip 105 of FIGS. 21-26. The first plurality of wire channels 115b and the second plurality of wire channels 115c of FIG. 10, the first plurality of wire channels 117b and the second plurality of wire channels 117c of FIG. 17, and the first plurality of wire channels 119b and the second plurality of wire channels 119c of FIG. 21 could have more wire channels.

The wire management clip 102 of FIGS. 2-5 and 7 show three plurality of wire channels, while the wire management clip 103 of FIGS. 8-13, the wire management clip 104 of FIGS. 14-20, and the wire management clip 105 of FIGS. 21-26 each show two plurality of wire channels. The wire management clips are not limited to the specific number of pluralities of wire channels shown. They could have more or fewer pluralities of wire channels. For example, referring to FIG. 4, the wire management clip 102, could have a forth plurality of wire channels extending downward from the lower arm 102d. Alternatively it could have one, or two pluralities of wire channels. The wire management clip 103 of FIG. 10, the wire management clip 104 of FIG. 17, and the wire management clip 105 of FIG. 21 could each include a single plurality of wire channels or could include more pluralities of wire channels than those illustrated.

The second plurality of wire channels 102g of FIG. 4, the second plurality of wire channels 115c of FIG. 10, the first plurality of wire channels 117b of FIG. 14, and the first plurality of wire channels 119b of FIG. 24 each show stacked wire channels that include two wire apertures each. The stacked wire channels are not limited to two wire apertures but may include any number of wire apertures that allows sufficient clearance to place the wires or remove the wires.

The wire apertures within the stacked wire channels of FIGS. 4, 10, 17, and 21 are illustrated as being separated by detents that come to an apex. This is shown in detail for wire channel detent 102v and wire channel detent 102u of FIG. 5 that separate the wire aperture 102s and the wire aperture 102t. This principle has been used throughout the other examples. While these detents follow the natural radius of the wire channels, other shaped detents could be used. For example, the detents could be round or rectangular.

While the first plurality of wire channels and the second plurality of wire channels in each example are illustrated having apertures of a particular size relative to other apertures, the size and orientation is not limited to what is illustrated. For example, in FIG. 4, the first plurality of wire channels 102f can be oriented so it faces either away from or below the rail 106 of FIG. 3 and could include wire channels that are either larger or smaller. Likewise, the second plurality of wire channels 102g of FIG. 4 could be oriented to face the rail 106 of FIG. 3 or face downward and extend from lower arm 102d of FIG. 3 and could likewise, have wire apertures that are larger or smaller.

While four examples of wire management clips were discussed, wire management clip 102 of FIGS. 2-5 and 7, wire management clip 103 of FIGS. 8-13, wire management clip 104 of FIGS. 14-20, and wire management clip 105, of FIGS. 21-26, these examples include features that are not mutually exclusive. They include features that may be interchanged.

For example, the upper hinge arm 115r or lower hinge arm 115t of FIG. 10, or lower hinge arm 117t of FIG. 14 could be applied to the second plurality of wire channels 102g of FIG. 4 or to the first plurality of wire channels 119b of FIG. 21. The third plurality of wire channels 102dd of FIG. 4 could be added to the bottom of the panel retainer 115a of FIG. 8, the top of the panel retainer 117a of FIG. 14, or the top of the panel retainer 119a of FIG. 24.

The variations described above for the wire management clip 102 of FIGS. 2-4 and 7 can also be applied to the wire management clip 132 of FIGS. 27-31.

The variations described, the general principles taught, as well as undescribed variations, devices, and systems that encompass at least some of the general principles described in this disclosure, are within the scope of the claims.

The invention claimed is:

1. A device for attaching wires to a rail of a solar panel assembly that attaches to building structure or a ground-mount structure, comprising:
   a wire management clip that includes a body and an upper arm extending from the body;
   the body includes a plurality of wire channels with one or more wire channels within the plurality of wire channels spaced apart a pre-determined distance; and
   the upper arm is so structured and arranged with respect to the body that with the wire management clip being secured to the rail, the upper arm engages and secures to a rail side of the rail and to a rail slot extending lengthwise along a rail top of the rail.

2. The device of claim 1 wherein:
   the upper arm comprises a pivoting hook and a detenting hook; and
   the pivoting hook and the detenting hook are so structured that with the wire management clip being secured to the rail, the pivoting hook engages and is secured to the rail top and the detenting hook engages and is secured to the rail side.

3. A device for attaching wires to a rail of a solar panel assembly that attaches to building structure or a ground-mount structure, comprising:
   a wire management clip that comprises a body and an upper arm extending from the body;
   the body includes a plurality of wire channels with one or more wire channels within the plurality of wire channels spaced apart a pre-determined distance;
   the upper arm is so structured and arranged with respect to the body that with the wire management clip being secured to the rail, the upper arm engages and secures to two or more faces of the rail;
   the wire management clip further comprises a lower arm, the plurality of wire channels positioned between the upper arm and the lower arm; and
   the upper arm and the lower arm, are so structured and arranged that with the wire management clip being secured to the rail, the lower arm engages a rail bottom.

4. The device of claim 3, wherein:
   the wire management clip further comprises a pivoting hook and a detenting hook; and
   the pivoting hook and detenting hook are so structured and arranged that with the wire management clip being secured to the rail, the pivoting hook secures to a first face of the two or more faces of the rail and the detenting hook secures to a second face of the two or more faces of the rail.

5. The device of claim 3, further comprising:
   a wire cavity formed between the lower arm, the upper arm, and the plurality of wire channels.

6. The device of claim 1, further wherein:
   the plurality of wire channels is a first plurality of wire channels of a first size that are spaced apart a first pre-determined distance in a first orientation, and a second plurality of wire channels of a second size that is different from the first size and spaced apart a second pre-determined distance in a second orientation that is different from the first orientation.

7. The device of claim 1, wherein:
   the plurality of wire channels is a first plurality of wire channels that are spaced apart a first pre-determined distance in a first orientation, and a second plurality of wire channels of a second size that are spaced apart a second pre-determined distance in a second orientation that is different from the first orientation.

8. The device of claim 7, wherein:
   the first plurality of wire channels includes a first wire channel, a second wire channel, and a wire channel wall, the first wire channel and the second wire channel are spaced apart by the wire channel wall.

9. The device of claim 7, wherein:
   the first plurality of wire channels and the second plurality of wire channels are co-planar.

10. A device for attaching wires to a rail of a solar panel assembly that attaches to building structure or a ground-mount structure, comprising:
    a wire management clip that comprises a body, an upper arm and a lower arm spaced apart by the body and extending from the body;
    the body includes a plurality of wire channels, with one or more wire channels within the plurality of wire channels spaced apart a pre-determined distance; and
    the upper arm and lower are so structured that with the wire management clip being secured to the rail, the upper arm engages and secures to one or more rail faces and the lower arm engages a rail bottom.

11. The device of claim 10 wherein:
    the upper arm comprises a pivoting hook positioned at an end of the pivoting hook positioned away from the body; and
    the pivoting hook is so structured that with the wire management clip being secured to the rail, the pivoting hook engages and is secured to a first rail face of the one or more rail faces.

12. The device of claim 11, wherein:
    the upper arm comprises a detenting hook in positioned where the upper arm meets the body; and
    the detenting hook is so structured that with the wire management clip being secured to the rail, the detenting hook engages and is secured to a second rail face of the one or more rail faces.

13. The device of claim 10, wherein:
    the plurality of wire channels is a first plurality of wire channels that includes first wire channels of a first size that are spaced apart a first pre-determined distance in a first orientation, and a second plurality of wire channels with second wire channels of a second size that is different from the first size and spaced apart a second pre-determined distance in a second orientation that is different from the first orientation.

14. The device of claim 13, wherein:
    the first plurality of wire channels and the second plurality of wire channels are co-planar.

15. The device of claim 10, wherein:
    the plurality of wire channels is a first plurality of wire channels that includes first wire channels that are spaced apart a first pre-determined distance in a first orientation, and a second plurality of wire channels with second wire channels spaced apart a second pre-determined distance in a second orientation that is different from the first orientation.

16. A device for attaching wires to a rail of a solar panel assembly that attaches to building structure or a ground-mount structure, comprising:
- a wire management clip that includes a body and an upper arm that includes an open end that extends away from the body;
- the body includes a plurality of wire channels with one or more wire channels within the plurality of wire channels spaced apart a pre-determined distance; and
- the upper arm is so structured and arranged with respect to the body that with the wire management clip being secured to the rail, the upper arm engages and secures to two or more faces of the rail.

17. The device of claim 16 wherein:
- the upper arm comprises a pivoting hook and a detenting hook; and
- the pivoting hook and the detenting hook are so structured that with the wire management clip being secured to the rail, the pivoting hook engages and is secured to a rail top of the rail and the detenting hook engages and is secured to a rail side of the rail.

18. The device of claim 16, further wherein:
- the plurality of wire channels is a first plurality of wire channels of a first size that are spaced apart a first pre-determined distance in a first orientation, and a second plurality of wire channels of a second size that is different from the first size and spaced apart a second pre-determined distance in a second orientation that is different from the first orientation.

19. The device of claim 16, wherein:
- the plurality of wire channels is a first plurality of wire channels that are spaced apart a first pre-determined distance in a first orientation, and a second plurality of wire channels of a second size that are spaced apart a second pre-determined distance in a second orientation that is different from the first orientation.

20. The device of claim 16, wherein:
- the plurality of wire channels includes first stacked wire channel with wire apertures with the first stacked wire channel serially stacked away from each other with respect to a first common opening and a second stacked wire channel spaced apart from the first stacked wire channel and including a second stacked wire channel with wire apertures with the second stacked wire channel serially stacked away from each other with respect to a second common opening.

21. A device for attaching wires to a rail of a solar panel assembly that attaches to building structure or a ground-mount structure, comprising:
- the rail that includes a rail top, a rail slot extending lengthwise along the rail top and a rail side extending downward from the rail top;
- a wire management clip that includes a body and an upper arm extending from the body;
- the body includes a plurality of wire channels with one or more wire channels within the plurality of wire channels spaced apart a pre-determined distance; and
- the upper arm is so structured and arranged with respect to the body that with the wire management clip being secured to the rail, the upper arm engages and secures to the rail side and to the rail slot extending lengthwise along the rail top.

22. The device of claim 21 wherein:
- the upper arm comprises a pivoting hook and a detenting hook; and
- the pivoting hook and the detenting hook are so structured that with the wire management clip being secured to the rail, the pivoting hook engages and is secured to the rail top and the detenting hook engages and is secured to the rail side.

23. The device of claim 21, further wherein:
- the plurality of wire channels is a first plurality of wire channels of a first size that are spaced apart a first pre-determined distance in a first orientation, and a second plurality of wire channels of a second size that is different from the first size and spaced apart a second pre-determined distance in a second orientation that is different from the first orientation.

24. The device of claim 21, wherein:
- the plurality of wire channels is a first plurality of wire channels that are spaced apart a first pre-determined distance in a first orientation, and a second plurality of wire channels of a second size that are spaced apart a second pre-determined distance in a second orientation that is different from the first orientation.

25. The device of claim 21, wherein:
- the plurality of wire channels includes first stacked wire channel with wire apertures with the first stacked wire channel serially stacked away from each other with respect to a first common opening and a second stacked wire channel spaced apart from the first stacked wire channel and including a second stacked wire channel with wire apertures with the second stacked wire channel serially stacked away from each other with respect to a second common opening.

* * * * *